United States Patent
Kyuno

(10) Patent No.: US 9,270,088 B2
(45) Date of Patent: Feb. 23, 2016

(54) METHOD FOR INSPECTING SPARK PLUG AND METHOD FOR MANUFACTURING SPARK PLUG

(71) Applicant: NGK SPARK PLUG CO., LTD., Nagoya (JP)

(72) Inventor: Jiro Kyuno, Kiyosu (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 14/079,989

(22) Filed: Nov. 14, 2013

(65) Prior Publication Data

US 2014/0141680 A1 May 22, 2014

(30) Foreign Application Priority Data

Nov. 19, 2012 (JP) ................. 2012-253018
Nov. 27, 2012 (JP) ................. 2012-258384
Nov. 12, 2013 (JP) ................. 2013-234457

(51) Int. Cl.
*H01T 13/60* (2011.01)
*H01T 21/06* (2006.01)
*H04N 5/372* (2011.01)

(52) U.S. Cl.
CPC ................ *H01T 13/60* (2013.01); *H01T 21/06* (2013.01); *H04N 5/372* (2013.01)

(58) Field of Classification Search
CPC ......... H01T 13/60; H01T 21/06; H04N 5/372
USPC ........................................ 445/3, 4
See application file for complete search history.

(56) References Cited

U.S. PATENT DOCUMENTS

| 4,004,213 | A  | * | 1/1977  | Kato et al. ............... 324/399 |
| 5,254,954 | A  |   | 10/1993 | Fujimoto et al. |
| 5,300,955 | A  | * | 4/1994  | Kelley .................. 346/150.2 |
| 6,193,575 | B1 | * | 2/2001  | Nakatani ................... 445/4 |

(Continued)

FOREIGN PATENT DOCUMENTS

| JP | 04-289681 A | 10/1992 |
| JP | 10-197326 A | 7/1998 |

(Continued)

OTHER PUBLICATIONS

Office Action mailed Sep. 30, 2014 for the corresponding Japanese Application No. 2013-234457.
Extended European Search Report mailed Dec. 3, 2015 for the corresponding European Application No. 13005430.7.

*Primary Examiner* — Thomas A Hollweg
(74) *Attorney, Agent, or Firm* — Leason Ellis LLP

(57) ABSTRACT

A method for inspecting a spark plug that includes a tubular insulator having an axial hole, a center electrode inserted into the axial hole at a front end side thereof, a tubular metallic shell disposed around the insulator, an annular space defined by an outer circumferential surface of the insulator, and an inner circumferential surface of the metallic shell and opened frontward. The method includes steps of: inspecting insulation performance of the insulator based on whether dielectric breakdown is caused in the insulator when a voltage is applied to the center electrode; photographing an area including at least the center electrode, the insulator, and the annular space from a front end side in the direction of the axis when the voltage is applied to the center electrode; and determining whether the dielectric breakdown has occurred based on the photographed image.

11 Claims, 16 Drawing Sheets

(56) References Cited

U.S. PATENT DOCUMENTS

| | | | |
|---|---|---|---|
| 6,592,418 B2 * | 7/2003 | Ito et al. | 445/4 |
| 6,695,663 B2 * | 2/2004 | Ito et al. | 445/4 |
| 7,022,968 B1 * | 4/2006 | Hopper et al. | 250/215 |
| 7,483,562 B2 * | 1/2009 | Ito et al. | 382/152 |
| 8,531,095 B2 | 9/2013 | Ban et al. | |
| 8,672,722 B2 * | 3/2014 | Hirose et al. | 445/7 |
| 2002/0102898 A1 * | 8/2002 | Ito et al. | 445/4 |
| 2002/0142696 A1 * | 10/2002 | Ito et al. | 445/3 |
| 2012/0161605 A1 | 6/2012 | Ban et al. | |
| 2013/0337717 A1 * | 12/2013 | Hirose et al. | 445/3 |

FOREIGN PATENT DOCUMENTS

| | | |
|---|---|---|
| JP | 2004-335140 A | 11/2004 |
| JP | 2006-12799 A | 1/2006 |
| JP | 2006-343324 A | 12/2006 |
| JP | 2010-217068 A | 9/2010 |
| JP | 4625531 B | 11/2010 |
| JP | 4811932 B | 11/2011 |
| JP | 2012-185963 A | 9/2012 |

* cited by examiner

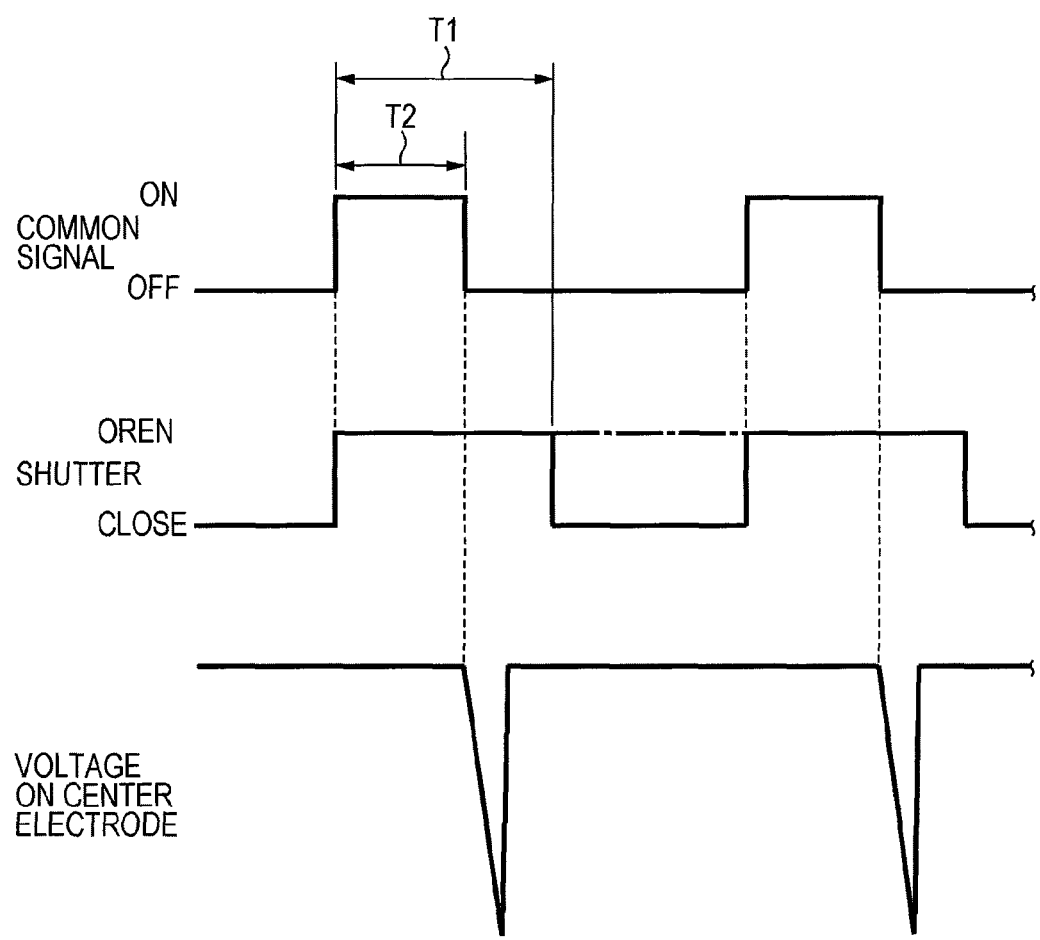

METHOD FOR INSPECTING SPARK PLUG AND METHOD FOR MANUFACTURING SPARK PLUG

This application claims the benefit of Japanese Patent Applications No. 2012-253018, filed Nov. 19, 2012, No. 2012-258384, filed Nov. 27, 2012, and No. JP 2013-234457, filed Nov. 12, 2013, the entire contents of which are hereby incorporated by reference.

FIELD OF THE INVENTION

The present disclosure relates to a method for inspecting a spark plug used for an internal combustion engine or the like, and a method for manufacturing the spark plug.

BACKGROUND OF THE INVENTION

A spark plug is installed in an internal combustion engine (engine) or the like and is used for igniting an air-fuel mixture or the like in a combustion chamber. In general, a spark plug includes an insulator having an axial hole extending along the axis thereof, a center electrode inserted into the axial hole at a front end side thereof, a metallic shell disposed around the insulator, and a ground electrode fixed at a front end portion of the metallic shell. A spark discharge gap is formed between a front end portion of the ground electrode and a front end portion of the center electrode. When high voltage is applied to the center electrode (spark discharge gap), spark discharge occurs at the spark discharge gap, whereby an air-fuel mixture or the like is ignited.

When the insulator has insufficient insulation performance (dielectric strength), the dielectric breakdown of the insulator may occur due to the application of a high voltage to the center electrode. In this case, the discharge penetrating the insulator (so-called penetration discharge) may occur between the center electrode and the metallic shell. In a state that the penetration discharge may occur, the application of high voltage to the center electrode (spark discharge gap) may not result in the normal spark discharge in the spark discharge gap.

In view of this, in a process of manufacturing a spark plug, the insulation performance of the insulator is inspected. A method of inspecting the insulation performance is disclosed in, for example, JP-A-2012-185963. The method according to JP-A-2012-185963 produces a state in which the spark discharge does not occur in the spark discharge gap by the high-pressure gas. After that, high voltage is applied to the center electrode. Then, based on the waveform of the applied voltage, the insulation performance is inspected.

However, the discharge that may occur when high voltage is applied to the center electrode is not limited to the penetration discharge. The discharge may also occur, due to the spreading of the electric field across the surface of the insulator between the front end portion of the center electrode and the metallic shell. This kind of the discharge is so-called flashover. At least a part of the route of this discharge includes a front end surface of the insulator. Here, even though the flashover occurs, the dielectric breakdown of the insulator is not caused, which is different from the penetration discharge, and there is no particular problem in the insulation performance of the insulator. However, no particular difference is found between the waveform of the applied voltage in the occurrence of flashover and the waveform of the applied voltage in the occurrence of the penetration discharge. Thus, in the method according to JP-A-2012-185963, it is impossible to determine which one of the flashover and the penetration discharge has occurred. Therefore, a product in which flashover has occurred upon voltage application, but which actually has no problem with the insulation performance, may be treated as a defective product. Thus, this method may deteriorate the yield.

SUMMARY OF THE INVENTION

A method for inspecting a spark plug includes a tubular insulator having an axial hole extending in a direction of an axis, a center electrode inserted into the axial hole at a front end side thereof, and a tubular metallic shell disposed around the insulator. The spark plug has an annular space defined by an outer circumferential surface of the insulator and an inner circumferential surface of the metallic shell and opened frontward. The method includes steps of: inspecting insulation performance of the insulator based on whether dielectric breakdown is caused in the insulator when a voltage is applied to the center electrode; photographing an area including at least the center electrode, the insulator, and the annular space from a front end side in the direction of the axis when the voltage is applied to the center electrode; and determining whether the dielectric breakdown has occurred based on the photographed image.

BRIEF DESCRIPTION OF DRAWINGS

These and other features and advantages of the present invention will become more readily appreciated when considered in connection with the following detailed description and appended drawings, wherein like designations denote like elements in the various views, and wherein:

FIG. 3 is a timing chart illustrating the timing of opening a shutter, the timing of applying voltage to a center electrode, and the like.

Figure 1:
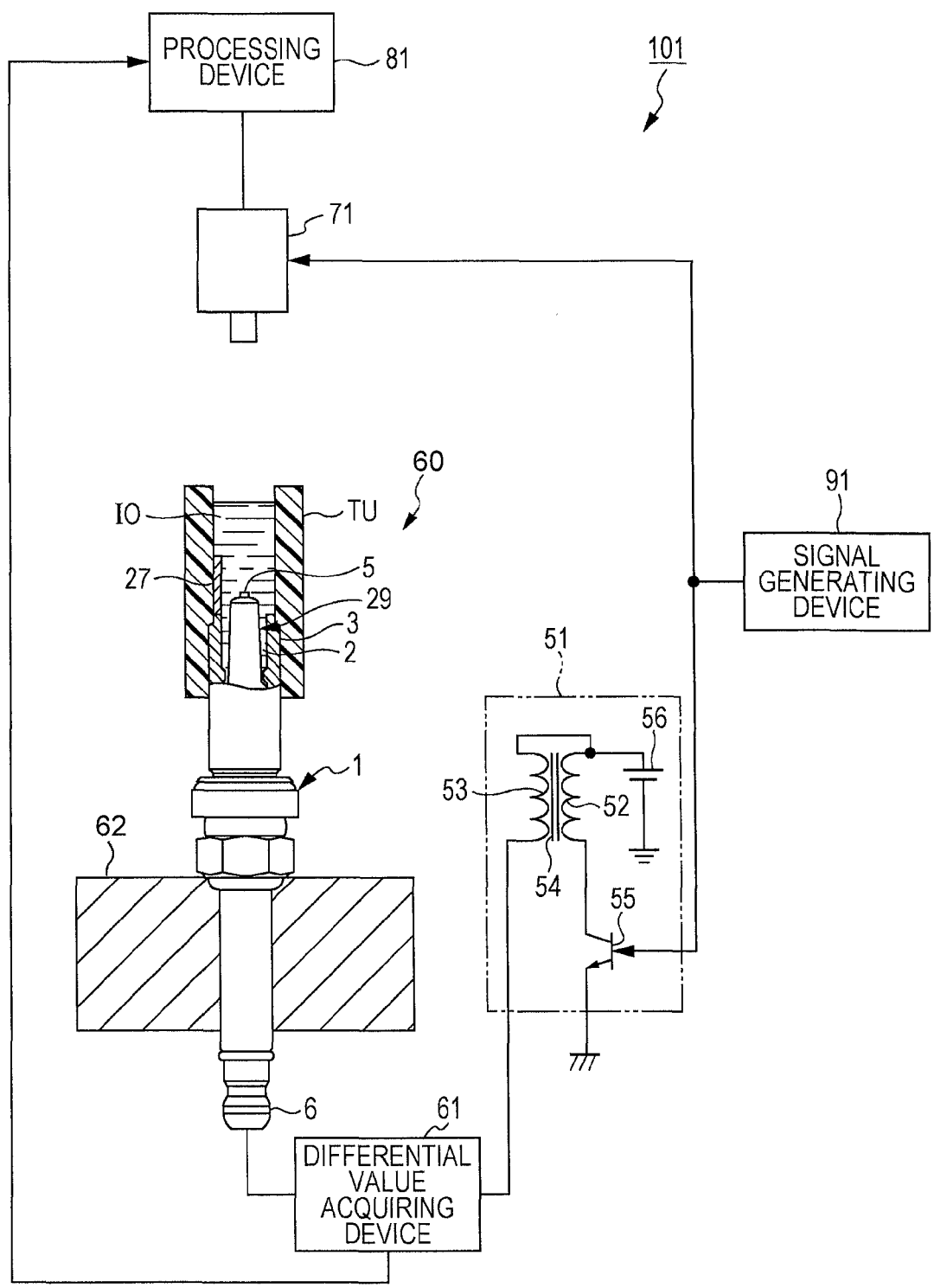
FIG. 1 is a schematic diagram illustrating a configuration of an inspection apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a method for inspecting a spark plug and a method for manufacturing a spark plug, that can discriminate between the flashover and the penetration discharge more reliably in the inspection of the insulation performance of the insulator and that can improve the yield.

Each configuration suitable for achieving the above object is described. Note that the operation effect obtained from the corresponding structure is additionally described as necessary.

Configuration 1: a method for inspecting a spark plug. In the present configuration, the spark plug includes a tubular insulator having an axial hole extending in a direction of an axis, a center electrode inserted into the axial hole at a front end side thereof, and a tubular metallic shell disposed around the insulator. The spark plug has an annular space defined by an outer circumferential surface of the insulator and an inner circumferential surface of the metallic shell and opened frontward. In the present configuration, the method includes steps of: inspecting insulation performance of the insulator based on whether dielectric breakdown is caused in the insulator when a voltage is applied to the center electrode; photographing an area including at least the center electrode, the insulator, and the annular space from a front end side in the direction of the axis when the voltage is applied to the center electrode; and determining whether the dielectric breakdown has occurred based on the photographed image.

The flashover is the discharge that spreads across the front end surface of the insulator. Meanwhile, the penetration discharge is the discharge that occurs in an annular space penetrating through the insulator without spreading across the front end surface of the insulator.

In view of these, according to the configuration 1, the area of the spark plug that includes at least the center electrode, the insulator, and the annular space is photographed from the front end side in the axial direction when the voltage is applied to the center electrode. Then, based on the photographed image, it is determined whether the dielectric breakdown has occurred. For example, if the discharge is seen in an area including the front end surface of the insulator in the photographed image, it is possible to determine that the flashover has occurred and the electric break down of the insulator has not occurred. Meanwhile, in the photographed image, if the discharge is not seen in the area including the front end surface of the insulator and the discharge is seen in the annular space, it is possible to determine that the penetration discharge has occurred and the dielectric breakdown of the insulator has occurred.

As thus described, according to the configuration 1 above, the flashover and the penetration discharge can be discriminated from each other (i.e., determining whether the dielectric breakdown has occurred) more reliably based on the photographed image obtained by photographing the spark plug from the front end side in the axial direction. Thus, whether the insulation performance of the insulator is adequate or poor can be inspected more accurately. As a result, the yield can be improved.

Configuration 2: a method for inspecting a spark plug according to the present configuration, in the above configuration 1, further includes a step of controlling time of photographing the image and timing of applying the voltage to the center electrode based on one common signal.

According to the configuration 2, it is easily possible to synchronize the time (timing) of photographing the image and the timing of applying voltage to the center electrode. Therefore, the spark plug in the middle of voltage application on the center electrode (when instant discharge occurs) can be photographed more reliably. Thus, whether the dielectric breakdown has occurred can be more accurately determined based on the photographed image. As a result, the inspection accuracy can be increased further.

Configuration 3: a method for inspecting a spark plug according to the present configuration, in the above configuration 1 or 2, further includes a step of determining whether the dielectric breakdown has occurred using information based on luminance of a region in the photographed image including the insulator and the annular space and using a predetermined threshold value.

The mode of discharge is different between the flashover and the penetration discharge. Therefore, the information based on the luminance in the occurrence of the flashover is different from the information based on the luminance in the occurrence of the penetration discharge.

Utilizing this point, according to the configuration 3 above, whether the dielectric breakdown has occurred in the insulator can be determined automatically. Therefore, the inspection accuracy can be increased further and the inspection time can be shortened.

Note that as a method of determining whether the dielectric breakdown has occurred, based on the information based on the luminance and the threshold value, methods according to the configurations 4 to 7 as described below are given.

Configuration 4: a method for inspecting a spark plug according to the present configuration, in the above configuration 3, further includes steps of: providing luminance of each pixel in the region as the information; binarizing the region based on the luminance of each pixel and the threshold value to give a binary image; calculating a barycentric coordinate of a high-luminance part of the binary image; and determining whether the dielectric breakdown has occurred based on the barycentric coordinate.

In the occurrence of the penetration discharge, the discharge is seen in the range including the annular space in the photographed image. Therefore, in the area including the insulator and the annular space, the high-luminance part exists on the side apart from the center electrode. Meanwhile, in the occurrence of the flashover, the discharge is seen in a manner of connecting between the center electrode and the metallic shell in the photographed image. Therefore, in the region, the high-luminance part also exists on the center electrode side.

In consideration of this point, according to the configuration 4 above, the barycentric coordinate of the part exhibiting the high luminance (high-luminance part due to the discharge) in the binary image is calculated. Based on the barycentric coordinate, whether the dielectric breakdown has occurred is determined. For example, if the barycentric coordinate exists on the center side of the center electrode, it is possible to determine that the flashover has occurred and the dielectric breakdown has not occurred. Meanwhile, if the barycentric coordinate exists apart from the center of the center electrode, it is possible to determine that the penetration discharge has occurred and the dielectric breakdown has occurred. According to the configuration 4 above, it is possible to accurately determine whether the dielectric breakdown has occurred, based on the difference in the position where the discharge has occurred between the penetration discharge and the flashover.

Configuration 5: a method for inspecting a spark plug according to the present configuration, in the above configuration 3, further includes steps of: providing luminance of each pixel in the region as the information; binarizing the area based on the luminance of each pixel and the threshold to give a binary image; and determining whether the dielectric breakdown has occurred is performed based on whether a high-luminance part of the binary image is continuous ranging from a position of the center electrode to a position of the annular space.

According to the configuration 5, whether the dielectric breakdown has occurred is determined based on whether the part exhibiting high luminance in the binary image (high-luminance part due to the discharge) is continuous ranging from the position of the center electrode to the position of the annular space. For example, if the part exhibiting the high luminance is continuous ranging from the position of the center electrode to the position of the annular space, it is possible to determine that the flashover has occurred and the dielectric breakdown has not occurred. Meanwhile, if the part exhibiting the high luminance is not continuous ranging from the position of the center electrode to the position of the annular space, it is possible to determine that the penetration discharge has occurred and the dielectric breakdown has occurred. In other words, according to the configuration 5 above, whether the dielectric breakdown has occurred can be accurately determined based on the difference in position where the discharge has occurred between the penetration discharge and the flashover.

Configuration 6: a method for inspecting a spark plug according to the present configuration, in the above configuration 3, further includes steps of: providing average luminance in the region as the information; and comparing the average luminance and the threshold value to determine whether the dielectric breakdown has occurred.

The penetration discharge occurs in the annular space. Therefore, it is difficult for the light from the discharge to reach the front end side in the axial direction (a photographing apparatus for photographing the image). For this reason, in the occurrence of the penetration discharge, the photographed image seems dark as a whole. The region includes a number of pixels with low luminance. Meanwhile, the flashover occurs spreading across the front end surface of the insulator. Therefore, the light from the discharge easily reaches the front end side in the axial direction (photographing apparatus). For this reason, in the occurrence of the flashover, the photographed image seems bright as whole. The region includes a number of pixels with high luminance.

In consideration of this point, according to the configuration 6, whether the dielectric breakdown has occurred is determined by comparing the average luminance in the region and the threshold value. For example, if the average luminance is greater than or equal to the threshold value, it is possible to determine that the flashover has occurred and the dielectric breakdown has not occurred. Meanwhile, if the average luminance is less than the threshold value, it is possible to determine that the penetration discharge has occurred and the dielectric breakdown has occurred. In other words, according to the configuration 6 above, whether the dielectric breakdown has occurred can be determined more reliably based on the difference in luminance in the photographed image that is caused by the difference in position where the discharge has occurred.

Configuration 7: a method for inspecting a spark plug according to the present configuration, in the above configuration 3, further includes steps of: providing luminance of each pixel in the region as the information; and determining whether the dielectric breakdown has occurred based on total number of pixels having luminance satisfying a predetermined relation with the threshold value.

According to the configuration 7 above, whether the dielectric breakdown has occurred is determined based on the total number of pixels satisfying a predetermined relation among the pixels in the region. For example, if the total number of pixels whose relation with the threshold value satisfies a predetermined condition (for example, the luminance is greater than or equal to the threshold value) is greater than or equal to a predetermine value, it is possible to determine that the flashover has occurred and the dielectric breakdown has not occurred. Meanwhile, if the total number of pixels whose relation with the threshold value satisfies the condition (for example, the luminance is greater than or equal to the threshold value) is less than predetermine value, it is possible to determine that the penetration discharge has occurred and the dielectric breakdown has occurred. In other words, according to the configuration 7 above, whether the dielectric breakdown has occurred can be determined more reliably based on the difference in luminance of the pixels caused by the difference in position where the discharge has occurred.

Note that in the inspection, only one of the configurations 4 to 7 above may be used; alternatively, two or more of the configurations 4 to 7 above may be used.

Configuration 8: a method for inspecting a spark plug according to the present configuration, in any of the above configurations 1 to 7, includes steps of: obtaining a differential value of the voltage applied to the center electrode; and determining whether the dielectric breakdown has occurred based on the photographed image when the differential value is not less than or greater than a predetermined determination threshold value.

According to the configuration 8 above, whether the dielectric breakdown has occurred is not necessarily determined relative to all of the photographed images. Whether the dielectric breakdown has occurred is determined when the differential value of the voltage applied to the center electrode is not less than or greater than a determination threshold value. In other words, the inspection target is just the spark plug in which the discharge (flashover or penetration discharge) has occurred between the center electrode and the metallic shell by the application of the voltage to the center electrode. Therefore, the process load during the inspection can be reduced and the inspection time can be shortened further.

Configuration 9: a method for inspecting a spark plug according to the present configuration, in any of the above configurations 1 to 8, includes a step of inspecting whether dielectric breakdown has occurred in the insulator by application of the voltage to the center electrode after the determination. The inspection step includes: a calculation step of receiving a vibration wave generated from the spark plug when the voltage is applied to the center electrode, obtaining a power spectrum by performing fast Fourier transformation on a vibration wave signal representing the vibration wave, and then calculating an integral value of a predetermined frequency range in the power spectrum; and a judgment step of judging whether discharge has occurred due to the dielectric breakdown in the insulator by using the integral value.

According to the configuration 9, the power spectrum is obtained by having the vibration wave signal representing the vibration wave generated from the spark plug subjected to the fast Fourier transformation in addition to performing the above determination. Then, the integral value of a predetermined frequency range in the power spectrum is calculated. Thus, whether the dielectric breakdown has occurred in the insulator is judged. In other words, the integral value of the power spectrum is utilized in the judgment step, thereby accurately discriminating between the discharge due to the dielectric breakdown in the insulator and the discharge due to the other factor than the dielectric breakdown in the insulator.

Configuration 10: a method for inspecting a spark plug according to the present configuration, in the above configuration 9, whether the discharge has occurred due to the dielectric breakdown in the insulator may be judged by comparing the integral value and a predetermined threshold value in the judgment step.

According to the configuration 10 above, the occurrence of the discharge due to the dielectric breakdown in the insulator can be easily judged by comparing the integral value and the predetermined threshold value.

Configuration 11: a method for inspecting a spark plug according to the present configuration, in the above configuration 9, the calculation step includes a step of calculating a ratio between a first integral value as the integral value of a first frequency range included in the predetermined frequency range in the power spectrum and a second integral value as the integral value of a second frequency range, which is different from the first frequency range, included in the predetermined frequency range. The judgment step may judge whether the discharge has occurred due to the dielectric breakdown in the insulator based on the ratio.

Here, the intensity of the vibration wave generated may change depending on the level of the applied voltage. However, the shape itself does not change even though the power spectrum changes in size. Therefore, according to the configuration 11 above, the judgment step is performed based on the ratio between the first integral value and the second integral value. Thus, even when the voltage applied to the center electrode fluctuates, the occurrence of the discharge due to the dielectric breakdown in the insulator can be easily judged based on a certain judgment criterion.

Configuration 12: a method for inspecting a spark plug according to the present configuration, in any of the above configurations 9 to 11, the predetermined frequency range may be a range of less than or equal to 1 MHz Here, the vibration wave generated by the discharge due to the dielectric breakdown in the insulator and/or the other discharge (for example, flashover) generally has a frequency of 1 MHz or less. Therefore, according to the configuration 12 above, the discharge due to the dielectric breakdown in the insulator can be accurately judged while the data for discriminating the discharge in the inspection step are suppressed to the minimum.

Configuration 13: a method for inspecting a spark plug according to the present configuration, in any of the above configurations 9 to 12, the inspection step may include a step of filling a space including the front end portion of the center electrode with any one of insulating liquid and compressed gas compressed to have higher pressure than atmospheric pressure before the predetermined voltage is applied.

According to the configuration 13 above, the space including the front end portion of the center electrode can be filled with any one of the compressed gas and the insulating liquid. Thus, in the inspection step, the normal discharge occurring between the center electrode and the ground electrode can be suppressed.

Configuration 14: a method for inspecting a spark plug according to the present configuration, in any of the above configurations 9 to 13, further includes a decision step of calculating, for each of plural frequency ranges with different power spectrums, a first particular integral value as the integral value obtained from the vibration wave generated from the inspection subject by the discharge due to the dielectric breakdown in the insulator and a second particular integral value as the integral value obtained from the vibration wave generated from the inspection subject by the discharge not due to the dielectric breakdown in the insulator, and deciding a particular frequency range where the difference between the first particular integral value and the second particular integral value is the maximum, wherein the particular frequency range decided in the decision step may be used as the predetermined frequency range in the calculation step.

According to the configuration 14 above, the particular frequency range where the difference between the first particular integral value and the second particular integral value is the maximum is set as the predetermined frequency range. Thus, the judgment step for judging whether the discharge has occurred due to the dielectric breakdown in the insulator with the use of the integral values can be performed with higher accuracy.

Configuration 15: a method for manufacturing a spark plug according to the present configuration includes a step of carrying out the inspection method of any of the above configurations 1 to 14.

According to the configuration 15, the operation effect similar to those of the configuration 1, etc. can be obtained.

Configuration 16: a method for manufacturing a spark plug according to the present configuration, in the above configuration 15, further includes a step of bending a straight rod-shaped ground electrode disposed at a front end portion of the metallic shell. The inspection method is carried out before the step of bending the ground electrode.

According to the configuration 16 above, the normal discharge occurring between the center electrode and the ground electrode can be suppressed during the inspection. Moreover, it is possible to avoid the situation that a part of the range including the center electrode, the insulator, and the annular space is hidden by the ground electrode when the photographed image is obtained. Therefore, the photographed image including the entire range can be obtained more reliably. Accordingly, the flashover and the penetration discharge (i.e., whether the dielectric breakdown has occurred) can be discriminated more reliably. As a result, whether the insulation performance is adequate or poor can be inspected more accurately.

Configuration 17: a method for manufacturing a spark plug according to the present configuration, in the above configuration 15 or 16, includes an assembly step of assembling a gasket around the metallic shell, wherein the inspection method may be carried out before the assembly step.

According to the configuration 17 above, the inspection can be performed without assembling an unnecessary part when the discrimination or judgment is performed. In other words, the spark plug determined to have experienced the discharge due to the dielectric breakdown in the inspection is treated as a defective product. Thus, the assembly of a gasket to the defective product can be prevented.

Configuration 18: a method for manufacturing a spark plug according to the present configuration, in any of the above configurations 15 to 17, may include an elimination step of eliminating the spark plug determined to have experienced the dielectric breakdown in the insulator in the determination or judgment out of the manufacturing process after the inspection method is carried out.

According to the configuration 18 above, it is possible to prevent the manufacture of the defective product having experienced the dielectric breakdown in the insulator as a finished product.

DETAILED DESCRIPTION OF THE INVENTION

An embodiment is hereinafter described with reference to the drawings. FIG. 1 is a schematic diagram illustrating the outline of a structure of an inspection apparatus 101 for a spark plug 1. The inspection apparatus 101 is used for inspecting the insulation performance (dielectric strength) of an insulator 2, which is described later, in a process of manufacturing the spark plug 1.

Figure 2:
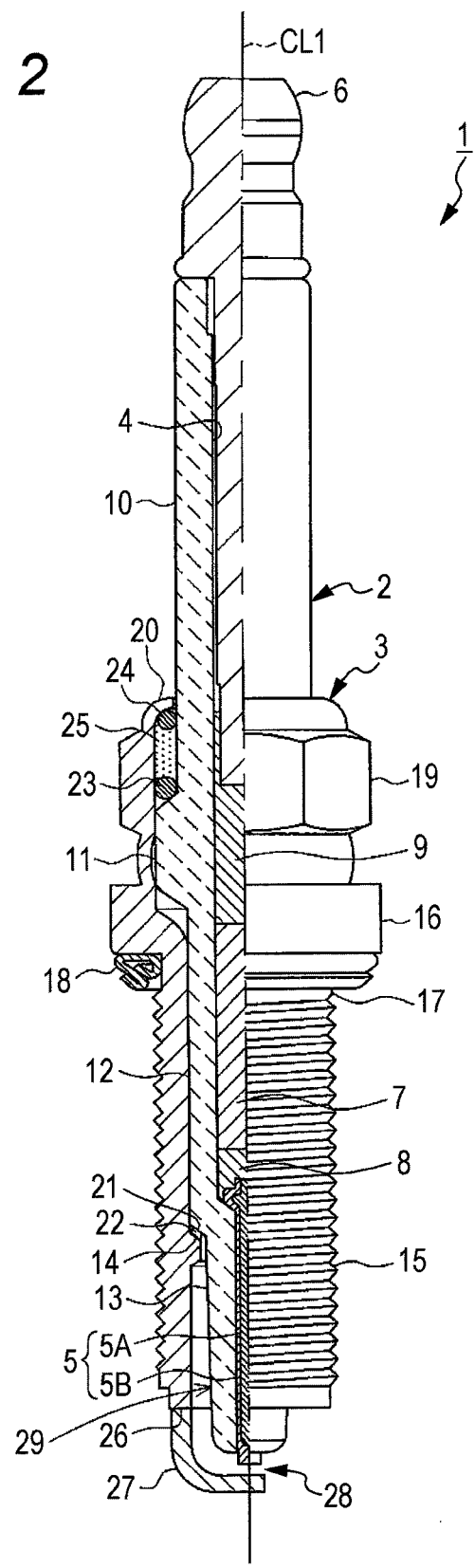
FIG. 2 is a partial cross-sectional diagram illustrating a structure of a spark plug.

First, before the explanation of the inspection apparatus 101, the structure of the spark plug 1 as the inspection target is described. FIG. 2 is a partial cross-sectional diagram illustrating the structure of the spark plug 1. Note that, in FIG. 2, a direction of an axis CL1 of the spark plug 1 is the vertical direction, and the lower side is the front end side of the spark plug 1, while the upper side is the rear end side.

The spark plug 1 includes the insulator 2 as a tubular insulator, and a tubular metallic shell 3 which holds the insulator 2 therein.

The insulator 2 is formed from alumina or the like by firing, as well known in the art. The insulator 2, as viewed externally, includes a rear trunk portion 10 formed at the rear end side, a large-diameter portion 11, an intermediate trunk portion 12, and a leg portion 13. The large-diameter portion 11 is located frontward of the rear trunk portion 10 and projects radially outward. The intermediate trunk portion 12 is located frontward of the large-diameter portion 11 and is smaller in diameter than the large-diameter portion 11. The leg portion 13 is located frontward of the intermediate trunk portion 12 and is smaller in diameter than the intermediate trunk portion 12. The large-diameter portion 11, the intermediate trunk portion 12, and the greater portion of the leg portion 13 of the insulator 2 are accommodated within the metallic shell 3. In addition, a tapered step portion 14 is formed at a connection portion between the intermediate trunk portion 12 and the leg portion 13. The insulator 2 is seated on the metallic shell 3 at the step portion 14.

Further, the insulator 2 has an axial hole 4 extending therethrough along the axis CL1. A center electrode 5 is fixedly inserted into a front end portion of the axial hole 4. The center electrode 5 is composed of an inner layer 5A formed of a metal with high thermal conductivity (e.g., copper, a copper alloy, pure Ni, etc.), and an outer layer 5B formed of a Ni alloy which contains nickel (Ni) as a main component. The center electrode 5 has a rod-like shape (columnar shape) as a whole. The front end portion of the center electrode 5 projects from the front end of the insulator 2.

Additionally, a terminal electrode 6 is fixedly inserted into a rear end portion of the axial hole 4 and projects from the rear end of the insulator 2.

A columnar resistor 7 is disposed within the axial hole 4 between the center electrode 5 and the terminal electrode 6. Opposite end portions of the resistor 7 are electrically connected to the center electrode 5 and the terminal electrode 6, respectively, via electrically conductive glass seal layers 8 and 9.

The metallic shell 3 is formed into a tubular shape from a low-carbon steel or a like metal. The metallic shell 3 has, on its outer circumferential surface, a threaded portion (externally threaded portion) 15. The threaded portion 15 is adapted to mount the spark plug 1 into a combustion apparatus, e.g., an internal combustion engine or a fuel cell reformer. The metallic shell 3 has, on its outer circumferential surface, a seat portion 16 located rearward of the threaded portion 15. A ring-like gasket 18 is fitted to a screw neck 17 at the rear end of the threaded portion 15. Further, the metallic shell 3 has, near the rear end thereof, a tool engagement portion 19 having a hexagonal cross section and a crimp portion 20. The tool engagement portion 19 allows a tool, such as a wrench, to be engaged therewith when the metallic shell 3 is to be mounted to the combustion apparatus. Also, the crimp portion 20 is bent radially inward.

Also, a tapered step portion 21 is formed on the inner circumferential surface of the metallic shell 3 so as to receive the insulator 2, which butts against the step portion 21. The insulator 2 is inserted frontward into the metallic shell 3 from the rear end of the metallic shell 3. In a state in which the step portion 14 of the insulator 2 butts against the step portion 21 of the metallic shell 3, a rear-end opening portion of the metallic shell 3 is crimped radially inward (i.e., the above-mentioned crimp portion 20 is formed), whereby the insulator 2 is fixed to the metallic shell 3. An annular sheet packing 22 intervenes between the step portion 14 and the step portion 21. The sheet packing 22 retains the gastightness of a combustion chamber. Further, the sheet packing 22 suppresses or prevents outward leakage of fuel gas which enters the clearance between the inner circumferential surface of the metallic shell 3 and the leg portion 13 of the insulator 2, which is exposed to the combustion chamber.

Further, in order to ensure the gastightness which is established by crimping, annular ring members 23 and 24 intervene between the metallic shell 3 and the insulator 2 in a region near the rear end of the metallic shell 3, and a space between the ring members 23 and 24 is filled with powder of talc 25. That is, the metallic shell 3 holds the insulator 2 via the sheet packing 22, the ring members 23 and 24, and the talc 25.

Moreover, a ground electrode 27 is joined to a front end portion 26 of the metallic shell 3. The ground electrode 27 is bent at an intermediate portion thereof, and its distal end portion faces a front end portion (chip 31) of the center electrode 5. A spark discharge gap 33 is formed between the front end surface of the center electrode 5 (chip 31) and the front end portion (the other end portion) of the ground electrode 27, and spark discharge occurs at the spark discharge gap 33 in a direction approximately along the axis CL1.

Moreover, an annular space 29 being open frontward is provided at the front end portion of the spark plug 1. The annular space 29 is formed of the outer circumferential surface of the insulator 2 (leg portion 13) and the inner circumferential surface of the metallic shell 3. Next, the inspection apparatus 101 is described. As illustrated in FIG. 1, the inspection apparatus 101 includes a voltage applying device 51, an inspection device 60, a differential value acquiring device 61, a photographing device 71, a processing device 81, and a signal generating device 91.

The voltage applying device 51 applies high voltage to the center electrode 5. The voltage applying device 51 includes a primary coil 52, a secondary coil 53, a core 54, an igniter 55, and a battery 56 for supplying power.

The primary coil 52 has wires wound around the core 54. The primary coil 52 has one end connected to the battery 56 and the other end connected to the igniter 55. The secondary coil 53 has wires wound around the core 54. The secondary coil 53 has one end connected between the primary coil 52 and the battery 56, and the other end connected to the spark plug 1 (terminal electrode 6) when the insulation performance of the insulator 2 is inspected as described later.

In addition, the igniter 55 includes a predetermined transistor. The igniter 55 receives a common signal output from the signal generating device 91. Based on the input common signal, the igniter 55 starts or stops to supply power from the battery 56 to the primary coil 52. In the case of applying high voltage to the center electrode 5, as illustrated in FIG. 3, the common signal from the signal generating device 91 is switched from the off state to the on state. This allows the current to be supplied from the battery 56 to the primary coil 52, thereby forming a magnetic field around the core 54. In this state, the common signal from the signal generating device 91 is switched from the on state to the off state. This stops the transmission of electricity from the battery 56 to the primary coil 52. By the stop of the transmission of electricity, the magnetic field around the core 54 changes, so that the high voltage (for example, 30 to 50 kV) of negative polarity is generated in the secondary coil 53. The generated high voltage is applied to the center electrode 5 via the terminal electrode 6.

Figure 4A:
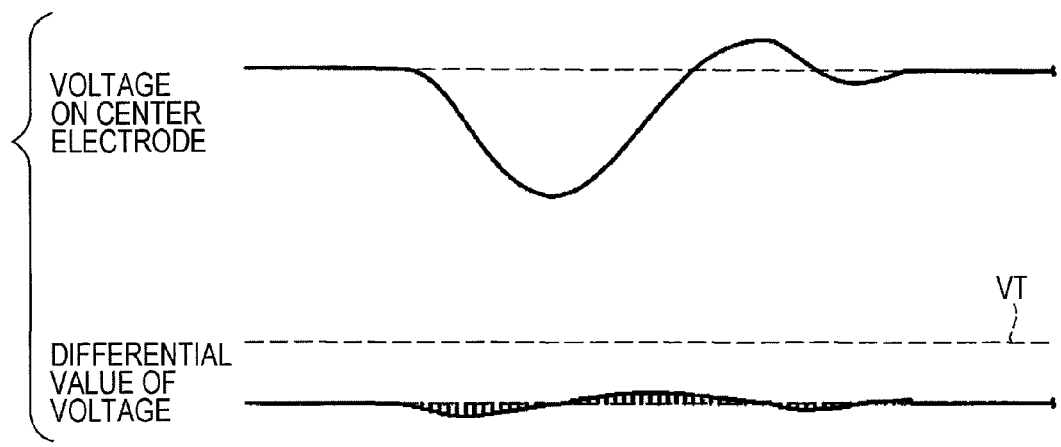
FIG. 4A is a graph illustrating the voltage applied to the center electrode and the differential value of the applied voltage in the case where discharge has not occurred between the center electrode and the metallic shell.
Figure 4B:
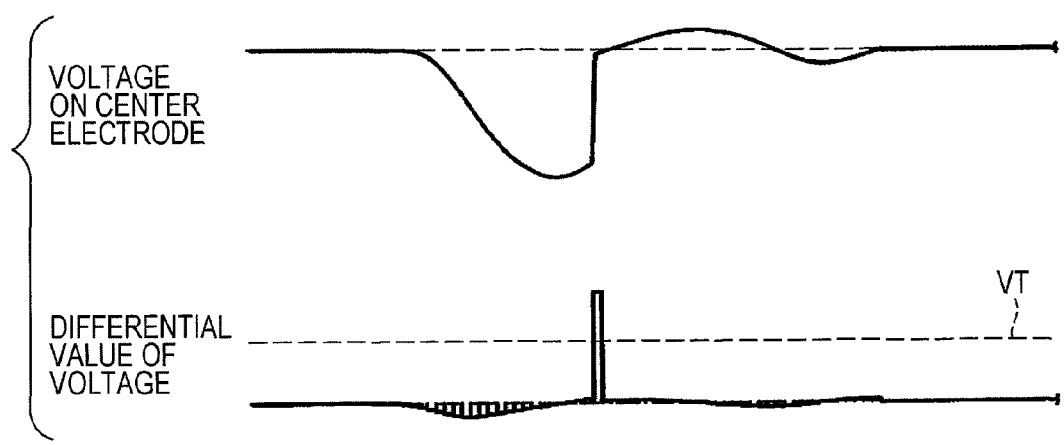
FIG. 4B is a graph illustrating the voltage applied to the center electrode and the differential value of the applied voltage in the case where the discharge has occurred between the center electrode and the metallic shell.

The differential value acquiring device 61 is provided for a route of transmission of electricity between the spark plug 1 and the voltage applying device 51, and acquires the differential value of the voltage applied to the center electrode 5. Here, when the voltage is applied to the center electrode 5, if the discharge (flashover or penetration discharge) does not occur between the center electrode 5 and the metallic shell 3, the voltage applied to the center electrode 5 changes relatively gradually as illustrated in FIG. 4A. Therefore, the absolute value of the differential value becomes relatively small. On the other hand, when the voltage is applied to the center electrode 5, if the discharge (flashover or penetration discharge) occurs between the center electrode 5 and the metallic shell 3, the voltage applied to the center electrode 5 changes suddenly as illustrated in FIG. 4B. Therefore, the differential value with a relatively large absolute value is obtained. In this embodiment, the differential value acquiring device 61 is configured so that a predetermined determination request signal is output to the processing device 81 if the obtained differential value is greater than or equal to a predetermined determination threshold value VT.

The photographing device 71 includes a predetermined CCD camera. The photographing device 71 photographs an image of the front end portion of the spark plug 1 disposed in the dark place from the front end side in the direction of the axis CL1, thereby obtaining the photographed image. Specifically, the photographing device 71 photographs an image in the range including at least the center electrode 5, the insulator 2, and the annular space 29 from the front end side in the direction of the axis CL1, thereby obtaining the photographed image including the range. Moreover, based on the common signal input from the signal generating device 91, the timing of opening the shutter of the photographing device 71 (i.e., the time (timing) of photographing the image) is controlled. In other words, as illustrated in FIG. 3, when the common signal input from the signal generating device 91 becomes on, the shutter is opened to start the photographing of the spark plug 1.

The photographing device 71 is set so that the time of opening the shutter (photographing time) T1 is sufficiently longer than the time T2 after the common signal is turned on and before the common signal is turned off. Therefore, while the shutter is open, the voltage is applied from the voltage applying device 51 to the center electrode 5. The photographing device 71 is configured to photograph the spark plug 1 in the middle of the voltage application to the center electrode 5.

The photographed image obtained by the photographing device 71 is input to the processing device 81. When the determination request signal is input from the differential value acquiring device 61, the processing device 81 determines whether the dielectric breakdown has occurred in the insulator 2 based on the photographed image. In other words, relative to only the spark plug 1 in which the discharge has occurred between the center electrode 5 and the metallic shell 3, the processing device 81 determines whether the discharge is the flashover (dielectric breakdown has not occurred in the insulator 2) or the penetration discharge (dielectric breakdown has occurred in the insulator 2). In this embodiment, the processing device 81 determines whether the dielectric breakdown has occurred in the insulator 2 based on the information from the luminance in the region of the photographed image including the insulator 2 and the annular space 29, and the predetermined threshold value.

Specifically, the processing device 81 compares the threshold value with the luminance of each pixel (corresponding to "information" of the present disclosure) in the region of the photographed image including the insulator 2 and the annular space 29. Thus, the processing device 81 binarizes the region and provides the binary image. The processing device 81 calculates the barycentric coordinate of the high-luminance part of the binary image. Based on the calculated barycentric coordinate, the processing device 81 determines whether the dielectric breakdown has occurred in the insulator 2.

Figure 5:
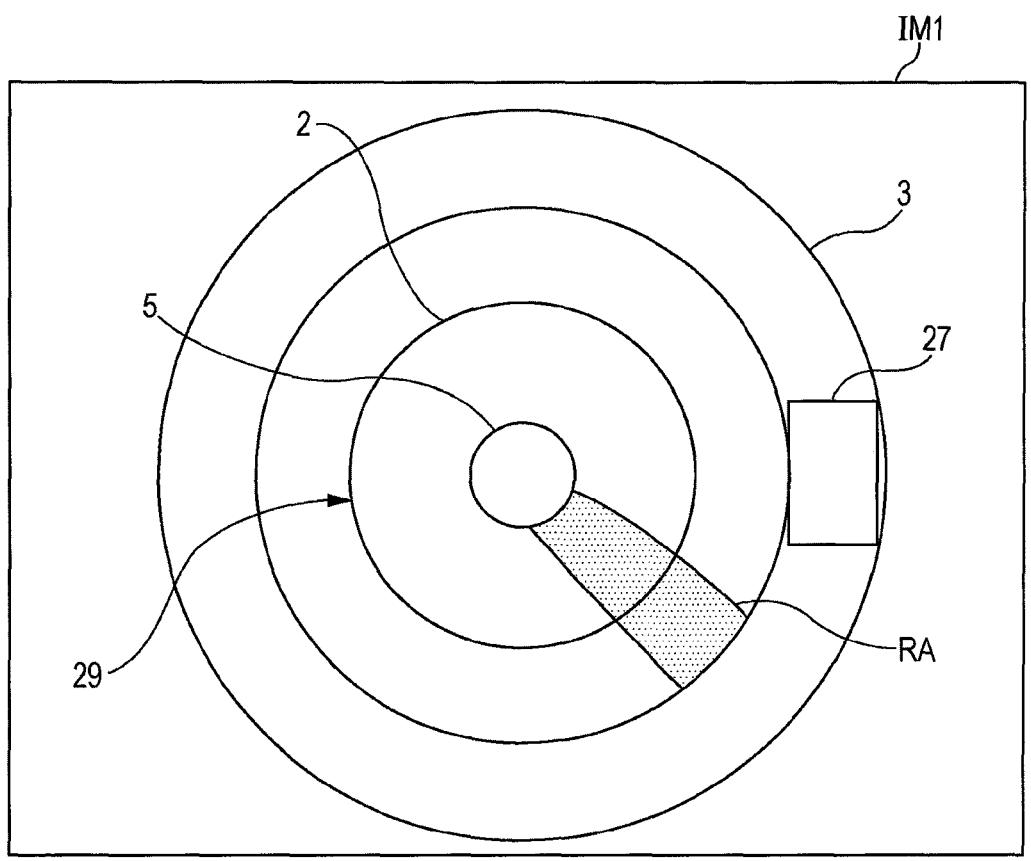
FIG. 5 is a schematic diagram illustrating a photographed image in the occurrence of flashover.
Figure 6:
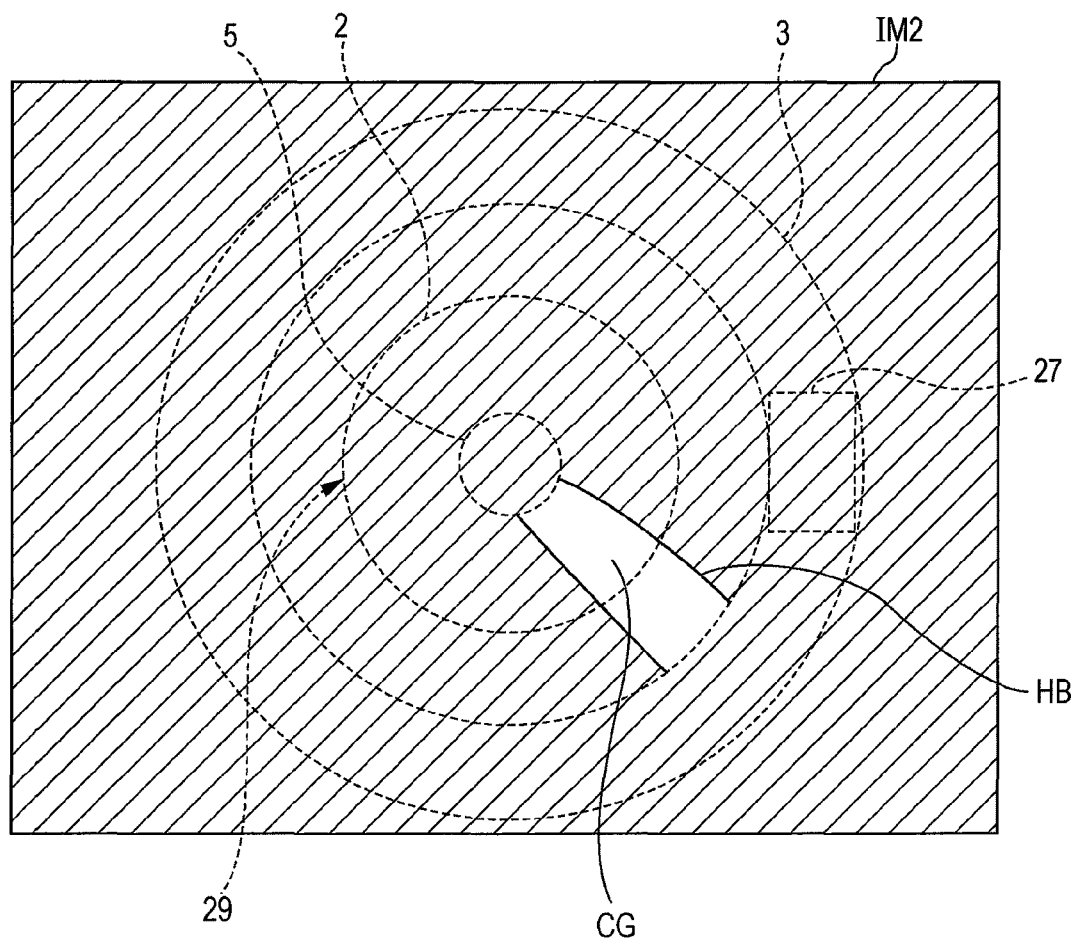
FIG. 6 is a schematic diagram illustrating a binary image in the occurrence of flashover.

Specifically, in the occurrence of the flashover, a high-luminance part RA (portion having high luminance due to the discharge, which is illustrated with scattered dots in FIG. 5) is formed in the obtained photographed image IM1, as illustrated in FIG. 5. This part RA is continuous ranging from the position of the center electrode 5 to the position of the annular space 29. A binary image IM2 obtained by binarizing this photographed image IM1 is illustrated in FIG. 6. In FIG. 6, a portion illustrated with oblique lines has low luminance. As illustrated in FIG. 6, a high-luminance part HB is continuous ranging from the position of the center electrode 5 to the position of the annular space 29. The barycentric coordinate CG of the part HB exists at the position relatively close to the center of the center electrode 5. Therefore, the processing device 81 determines that the flashover has occurred and the dielectric breakdown has not occurred in the insulator 2 (i.e., the insulation performance of the insulator 2 is adequate) if the position of the barycentric coordinate CG is on the center electrode 5 side. The case where the position of the barycentric coordinate CG is on the center electrode 5 side means the case where the distance from the barycentric coordinate CG to the center of the center electrode 5 is less than or equal to a predetermined value, and includes the case where the barycentric coordinate CG is in the range where the insulator 2 is positioned.

Figure 7:
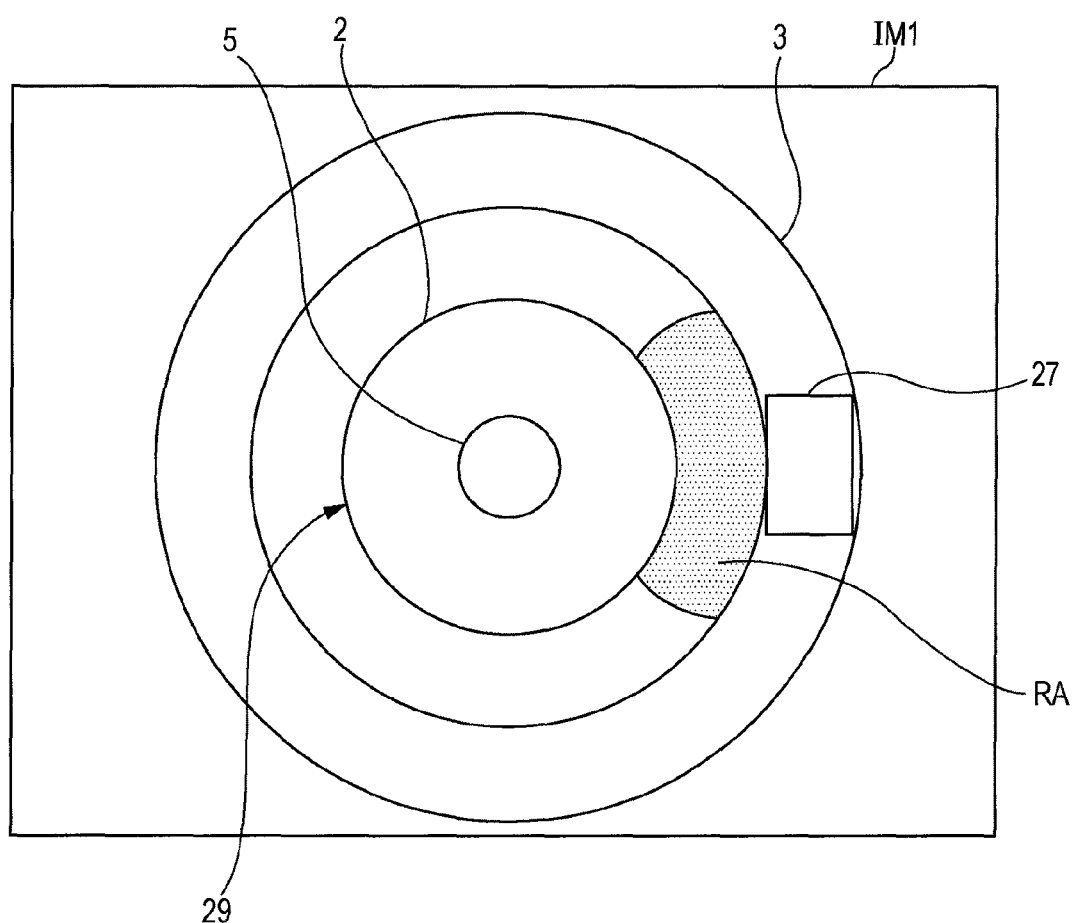
FIG. 7 is a schematic diagram illustrating a photographed image in the occurrence of penetration discharge.
Figure 8:
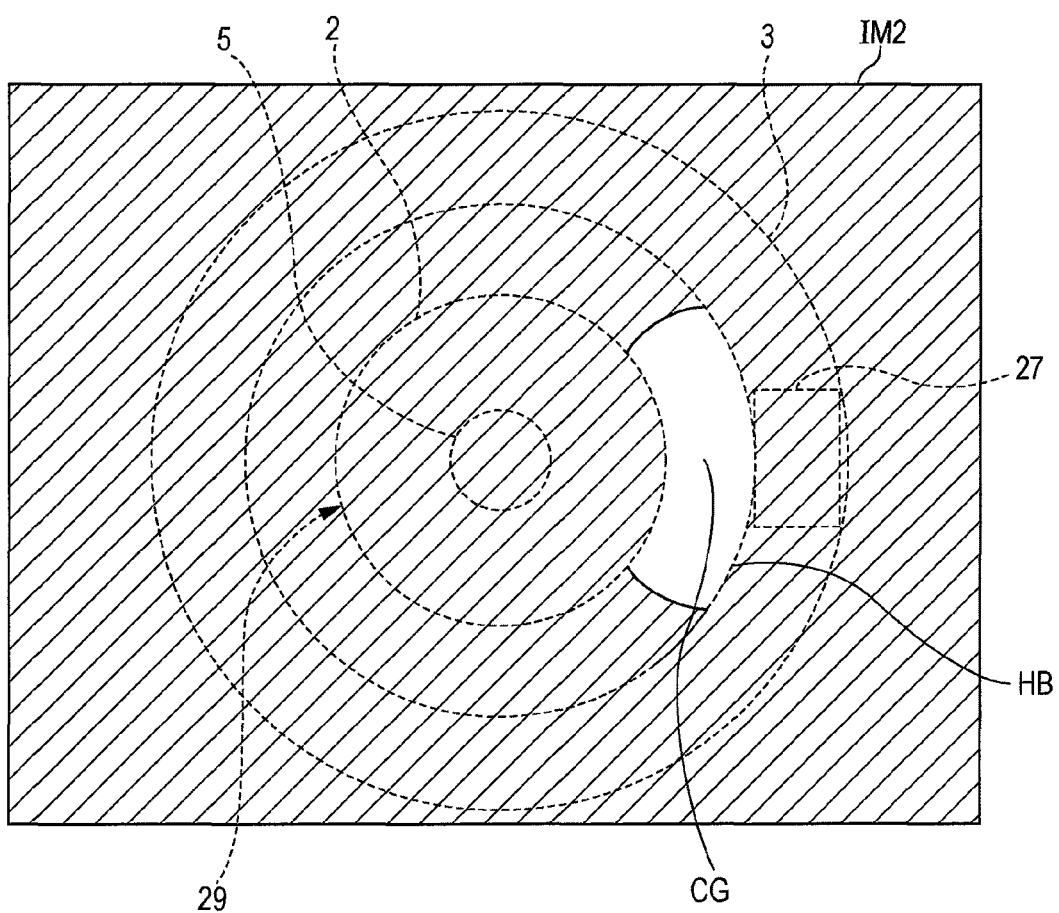
FIG. 8 is a schematic diagram illustrating a binary image in the occurrence of penetration discharge.

On the other hand, in the occurrence of the penetration discharge, the high-luminance part RA (portion having high luminance due to the discharge, which is illustrated with scattered dots in FIG. 7) is mainly formed in the range where the annular space 29 is positioned in the obtained photographed image IM1, as illustrated in FIG. 7. A binary image IM2 obtained by binarizing this photographed image IM1 is illustrated in FIG. 8. In FIG. 8, a portion illustrated with oblique lines has low luminance. As illustrated in FIG. 8, the high-luminance part HB is mainly in the range where the annular space 29 is positioned. The barycentric coordinate CG of the part HB exists at a position relatively away from the center of the center electrode 5. Therefore, the processing device 81 determines that the penetration discharge has occurred and the dielectric breakdown has occurred in the insulator 2 (i.e., the insulation performance of the insulator 2 is poor) if the position of the barycentric coordinate CG is away from the center of the center electrode 5. The case where the position of the barycentric coordinate CG is away from the center of the center electrode 5 means the case where the distance from the barycentric coordinate CG to the center of the center electrode 5 is greater than the predetermined value, and includes the case where the barycentric coordinate CG is in the range where the annular space 29 is positioned.

The processing device 81 is configured to display the determination results in a predetermined display unit (not shown).

The signal generating device 91 outputs a common signal to be input to the voltage applying device 51 and the photographing device 71. As aforementioned, in this embodiment, the timing of applying the voltage to the center electrode 5 by the voltage applying device 51 and the photographing time (photographing timing) of the image by the photographing device 71 are controlled based on one common signal.

Next, a method for manufacturing the spark plug 1 is described.

First, the insulator 2 is formed by molding. For example, base stock granulated particles are prepared using raw material powder containing alumina, which is a main component, and a binder, etc. Rubber-press molding is performed on the base stock granulated particles, thereby providing a tubular molded product. The product is shaped in a manner that the external shape of the product is ground. The shaped molded product is burned; thus, the insulator 2 is obtained.

Further, in addition to the insulator 2, the center electrode 5 is manufactured. In other words, the center electrode 5 is manufactured by forging an Ni alloy in which a copper alloy or the like for improving the heat dissipation property is disposed at the center.

The insulator 2 and the center electrode 5, which are obtained as above, the resistor 7, and the terminal electrode 6 are sealed and fixed by the glass seal layers 8 and 9. For manufacturing the glass seal layers 8 and 9, in general, borosilicate glass and metal powder are mixed to be prepared. The prepared mixture is poured into the axial hole 4 of the insulator 2 with the resistor 7 held therebetween. After that, the mixture is baked in a sintering furnace while the mixture is pressed with the terminal electrode 6 from behind. Note that on this occasion, a glaze layer may be sintered at the same time or formed in advance on a surface of the rear trunk portion 10 of the insulator 2.

Next, the metallic shell 3 is processed. That is, a penetration hole and the general form are formed by performing cold-forging on a columnar metal material (such as iron-based material such as S17C or S25C or a stainless steel material), for example. After that, the external shape is adjusted by grinding, thereby providing the intermediate of the metallic shell.

Subsequently, the front end surface of the intermediate of the metallic shell is subjected to resistance welding with the rod-like ground electrode 27 formed of a Ni alloy or the like. In the welding, so-called "droop" is generated; therefore, the droop is removed. After that, the threaded portion 15 is formed by rolling at a predetermined part of the intermediate of the metallic shell. Thus, the metallic shell 3 having the ground electrode 27 bonded thereto can be obtained. In order to improve the corrosion resistance, the metallic shell 3 having the ground electrode 27 welded thereto may be plated.

Next, the insulator 2 having the center electrode 5 and the terminal electrode 6 manufactured as above is fixed to the metallic shell 3 having the ground electrode 27. Specifically, the insulator 2 is inserted into the rear-end opening portion of the metallic shell 3. Then, the rear end portion of the metallic shell 3 is pressed along the axis CL1. This bends the rear end portion radially inward (i.e., the crimp portion 20 is formed). This fixes the insulator 2 and the metallic shell 3 to each other.

Next, with the use of the inspection apparatus 101, the insulation performance of the insulator 2 is inspected. First, as illustrated in FIG. 1, the spark plug 1 is supported so that the front end portion faces upward. Further, the front end portion of the metallic shell 3 is inserted into the tubular tube TU. Additionally, insulating oil IO is poured into the tube TU to fill the annular space 29. Further, the periphery of the front end portions of the center electrode 5 and the insulator 2 is disposed in the insulating oil IO. This can increase the insulation resistance between the front end portion of the center electrode 5 and the metallic shell 3. As a result, it is possible to suppress the occurrence of the flashover (though the flashover cannot be perfectly prevented). Note that, in this embodiment, the insulating oil IO is transparent and has a turbidity of 100 NTU or less. The unit "NTU" refers to the measurement unit for the formazin turbidity based on the formazin turbidity standard.

Next, the common signal output from the signal generating device 91 is turned on. This opens the shutter of the photographing device 71. Thus, the photographing of the region including the center electrode 5, the insulator 2, etc. through the insulating oil IO is started and the transmission of electricity from the battery 56 to the primary coil 52 is started. When the common signal is switched from the on state to the off state, the voltage is applied from the voltage applying device 51 to the center electrode 5. Moreover, with the photographing device 71, the photographed image of the spark plug 1 in the middle of the voltage application to the center electrode 5 is obtained. The obtained photographed image is input to the processing device 81.

The processing device 81 does not determine whether the dielectric breakdown has occurred, relative to all the input photographed images. The processing device 81 determines whether the dielectric breakdown has occurred relative to only the photographed image of the spark plug 1 that responds to the determination request signal input from the differential value acquiring device 61. Whether the dielectric breakdown has occurred is determined based on the barycentric coordinate CG of the high-luminance part HB in the binary image obtained from the photographed image as described above. Then, the determination result is displayed in the display unit.

After the insulation performance of the insulator 2 is inspected, the ground electrode 27 is bent toward the center electrode 5, thereby forming a spark discharge gap 28. In this embodiment, the insulation performance of the insulator 2 is inspected before the ground electrode 27 is bent.

After the spark discharge gap 28 is formed, the size of the spark discharge gap 28 is adjusted finely. Thus, the aforementioned spark plug 1 is obtained.

As described above in detail, according to this embodiment, it is possible to discriminate between the flashover and the penetration discharge (i.e., whether the dielectric breakdown has occurred) based on the photographed image obtained by photographing the spark plug 1 from the front end side in the direction of the axis CL1. As a result, whether the insulation performance of the insulator 2 is adequate or poor can be inspected more accurately. Thus, the yield can be improved.

Based on one common signal, the time of photographing the image and the timing of applying the voltage to the center electrode 5 are controlled. Therefore, it is possible to easily synchronize the time (timing) of photographing the image and the timing of applying the voltage to the center electrode 5. This enables the photographing of the spark plug 1 in the middle of the voltage application to the center electrode 5 (when instant discharge occurs) more reliably. As a result, whether the dielectric breakdown has occurred can be determined more accurately based on the photographed image and therefore, the inspection accuracy can be increased further.

In addition, in this embodiment, the processing device 81 can automatically determine whether the dielectric breakdown has occurred in the insulator 2. Therefore, the inspection accuracy can be increased further and the inspection time can be shortened.

Moreover, in this embodiment, the processing device 81 does not determine whether the dielectric breakdown has occurred, relative to all the photographed images. The processing device 81 is configured to determine whether the dielectric breakdown has occurred when the differential value of the voltage applied to the center electrode 5 is greater than or equal to the determination threshold value VT. In other words, the processing device 81 is configured to inspect only the spark plug 1 in which the discharge (flashover or penetration discharge) has occurred between the center electrode 5 and the metallic shell 3 by the application of the voltage to the center electrode 5. Thus, the process load during the inspection can be reduced and the inspection time can be shortened further.

In this embodiment, the insulation performance of the insulator 2 is inspected before the ground electrode 27 is bent. Therefore, it is possible to avoid the situation that a part of the range including the center electrode 5, the insulator 2, and the annular space 29 is hidden by the ground electrode 27 when the photographed image is obtained. Thus, the photographed image including the entire range can be obtained more reliably. As a result, the flashover and the penetration discharge (i.e., whether the dielectric breakdown has occurred) can be discriminated more reliably. Thus, whether the insulation performance is adequate or poor can be inspected more accurately.

The present disclosure is not limited to the description of the embodiment above and may be carried out in the following manner. Needless to say, other application examples or modified examples not described below are also possible.

(a) In the above embodiment, the differential value acquiring device 61 is configured to output the determination request signal to the processing device 81 if the acquired differential value is greater than or equal to the determination threshold value VT. However, the differential value acquiring device 61 may be configured to output the determination request signal to the processing device 81 if the acquired differential value exceeds the determination threshold value VT.

(b) In the above embodiment, the processing device 81 determines whether the dielectric breakdown has occurred in the insulator 2 based on the barycentric coordinate CG of the high-luminance part HB in the binary image IM2. However, the processing device 81 may determine whether the dielectric breakdown has occurred in the insulator 2 based on whether the high-luminance part HB is continuous ranging from the position of the center electrode 5 to the position of the annular space 29 in the binary image IM2.

Specifically, the flashover occurs to connect the front end portion of the center electrode 5 and the metallic shell 3. Therefore, in the photographed image, the high-luminance part exists so as to connect the center electrode 5 and the metallic shell 3. In view of this, when the high-luminance part HB is continuous ranging from the position of the center electrode 5 to the position of the annular space 29, the processing device 81 determines that the flashover has occurred and the dielectric breakdown has not occurred in the insulator 2 (the insulation performance of the insulator 2 is adequate).

On the other hand, the penetration discharge penetrates through the insulator 2. Therefore, in the photographed image, the high-luminance part HB exists in the annular space 29 and its periphery, and does not exist around the front end portion of the center electrode 5. In view of this, when the high-luminance part HB is not continuous ranging from the position of the center electrode 5 to the position of the annular space 29 in the binary image, the processing device 81 determines that the penetration discharge has occurred and the dielectric breakdown has occurred in the insulator 2 (the insulation performance of the insulator 2 is poor).

(c) In the above embodiment, the processing device 81 determines whether the dielectric breakdown has occurred in the insulator 2 based on the binary image obtained from the photographed image. However, the binary image is not always necessary, and the processing device 81 may determine whether the dielectric breakdown has occurred, based on the photographed image.

Therefore, for example, the processing device 81 obtains the luminance of the pixels in the region including the insulator 2 and the annular space 29 in the photographed image, and calculates the average luminance (corresponding to "information" of the present disclosure) in the region. The processing device 81 may determine whether the dielectric breakdown has occurred in the insulator 2 by comparing the calculated average luminance and a predetermined threshold value.

Figure 9:
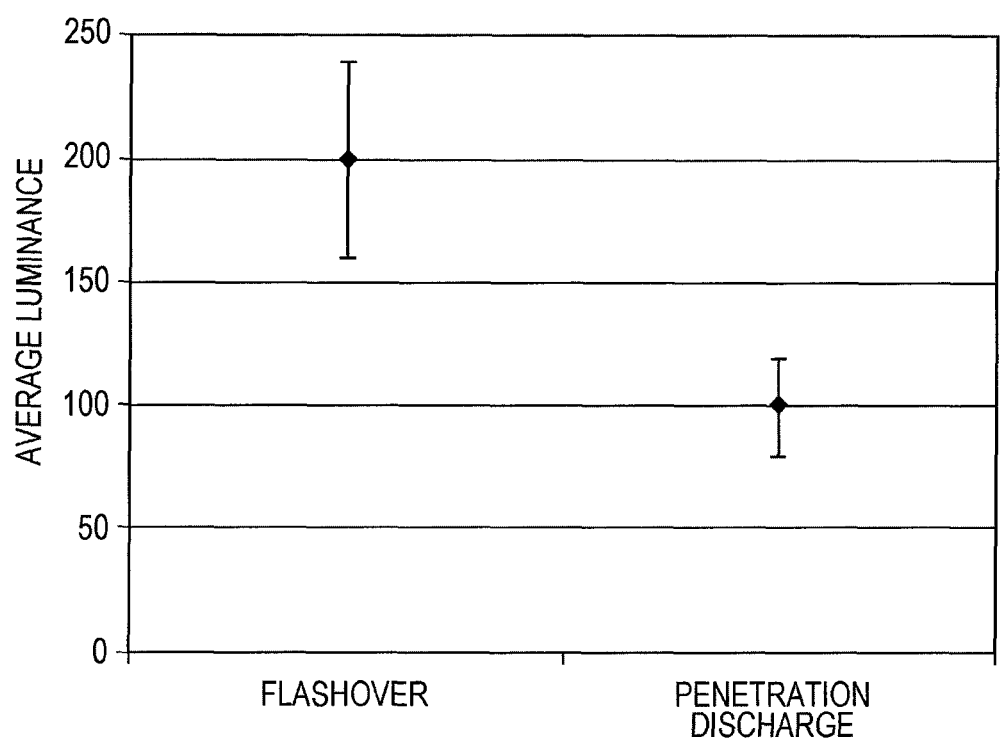
FIG. 9 is a graph illustrating the average luminance in the occurrence of flashover and the average luminance in the occurrence of penetration discharge.

Specifically, the flashover occurs spreading across the front end surface of the insulator 2 between the front end portion of the center electrode 5 and the metallic shell 3. Therefore, light easily reaches the photographing device 71 and the luminance becomes relatively high in the range where the insulator 2 is positioned and in the range where the annular space 29 is positioned. Therefore, in the photographed image, the luminance of each pixel in the region becomes relatively high and the average luminance also becomes high as illustrated in FIG. 9. In view of this, the processing device 81 determines that the flashover has occurred and the dielectric breakdown has not occurred in the insulator 2 (the insulation performance of the insulator 2 is adequate) if the average luminance is not less than or greater than the threshold value.

On the other hand, in the case of the penetration discharge, the discharge occurs in the annular space 29. Therefore, it is difficult for the light to reach the photographing device 71. Accordingly, the luminance in the range where the annular space 29 is positioned becomes relatively high, while the luminance in the range where the insulator 2 is positioned becomes relatively low. Thus, the average luminance becomes relatively low. In view of this, the processing device 81 determines that the penetration discharge has occurred and the dielectric breakdown has occurred in the insulator 2 (the insulation performance of the insulator 2 is poor) if the average luminance is less than or equal to the threshold value.

For example, the processing device 81 may obtain the luminance (corresponding to "information" of the present disclosure) of the pixels in the region including the insulator 2 and the annular space 29 in the photographed image. The processing device 81 may determine whether the dielectric breakdown has occurred in the insulator 2 based on the total number of the pixels having the luminance satisfying a predetermined relation with a predetermined threshold value (in this example, the total number of pixels having the luminance greater than or equal to the threshold value) among the pixels.

Specifically, in the occurrence of the flashover, the number of pixels with high luminance is increased in the region. Therefore, the total number of the pixels becomes relatively large. In view of this, if the total number is not less than or greater than a predetermined judgment value, the processing device 81 determines the flashover has occurred and the dielectric breakdown has not occurred in the insulator 2 (the insulation performance of the insulator 2 is adequate).

Meanwhile, in the occurrence of the penetration discharge, the number of pixels with high luminance in the region becomes smaller. Thus, the total number of the pixels becomes relatively small. In view of this, if the total number is less than or not greater than the judgment value, the processing device 81 determines that the penetration discharge has occurred and the dielectric breakdown has occurred in the insulator 2 (the insulation performance of the insulator 2 is poor). In this example, the aforementioned relation corresponds to the magnitude relation between the luminance and the threshold value. However, this relation may be changed as appropriate.

(d) In the above embodiment, during the inspection of the insulation performance, the voltage is applied to the center electrode 5 in a state that the periphery of the front end portions of the center electrode 5 and the insulator 2 is disposed in the insulating oil IO in order to suppress the occurrence of the flashover. However, alternatively, the voltage may be applied to the center electrode 5 in a state that the periphery of the front end portions of the center electrode 5 and the insulator 2 is filled with high-pressure gas (for example, high-pressure air). Note that neither the insulating oil IO nor the high-pressure gas may be used during the inspection of the insulation performance.

(e) In the above embodiment, the processing device 81 determines whether the dielectric breakdown has occurred, relative to only the photographed image of the spark plug 1 that responds to the determination request signal input from the differential value acquiring device 61. However, alternatively, the processing device 81 may determines whether the dielectric breakdown has occurred relative to all the photographed images.

A method for inspecting a spark plug according to the present configuration, in any of the above configurations 1 to 8, includes a step of inspecting whether dielectric breakdown has occurred in the insulator by application of the voltage to the center electrode after the determination. The inspection step includes: a calculation step of receiving a vibration wave generated from the spark plug when the voltage is applied to the center electrode, obtaining a power spectrum by performing fast Fourier transformation on a vibration wave signal representing the vibration wave, and then calculating an integral value of a predetermined frequency range in the power spectrum; and a judgment step of judging whether discharge has occurred due to the dielectric breakdown in the insulator by using the integral value.

The inspection step above is hereinafter described.

Figure 10:
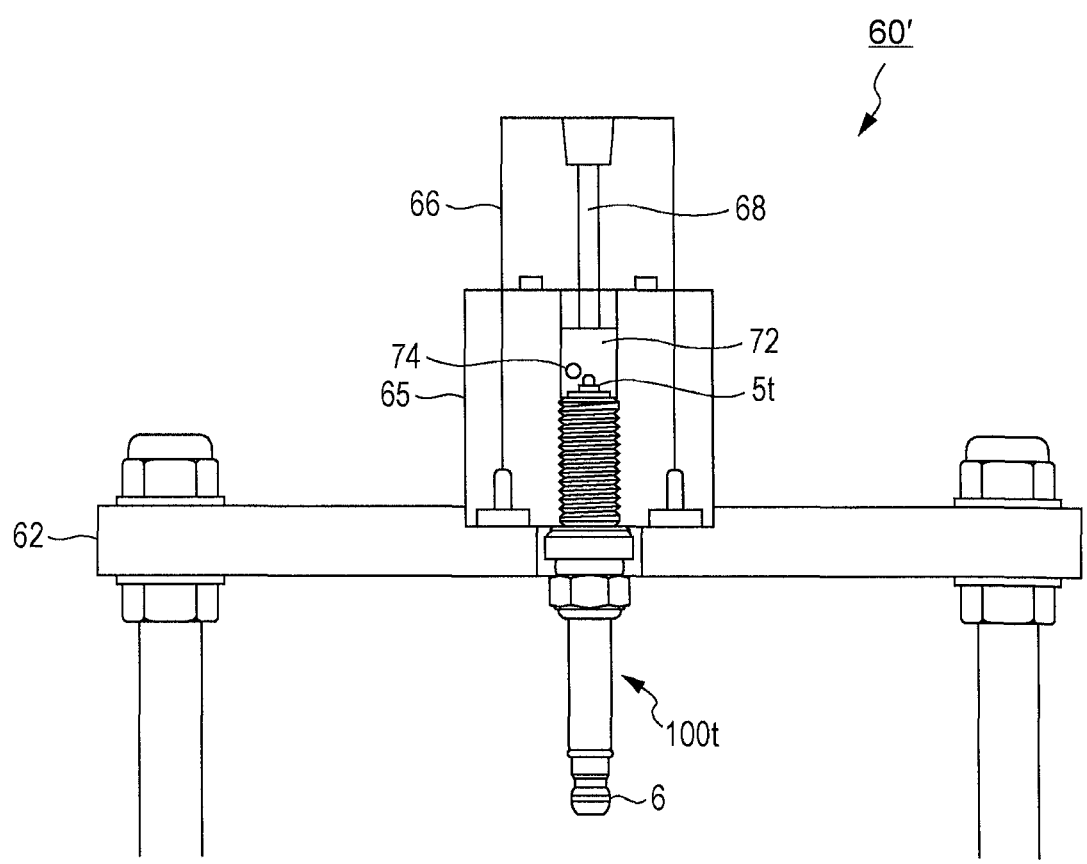
FIG. 10 is a diagram illustrating an inspection apparatus used in an inspection step.

FIG. 10 is a diagram for describing an inspection device 60' used in the inspection step. In FIG. 10, an inspection subject 100$t$ set in the inspection device 60' is also illustrated. For helping the understanding, the structure inside the device 60' and a part of the inspection subject 100$t$ disposed inside are also illustrated with solid lines.

The inspection device 60' includes an installation table 62, a casing 65, a pressure-applying cap 66, and an acoustic emission sensor (also called "AE sensor") 74. The installation table 62 is provided with a penetration hole through which the inspection subject 100$t$ is installed in the inspection device 60'. The pressure-applying cap 66 is a bottomed cylinder.

Inside the pressure-applying cap 66, a front end portion of the inspection subject 100$t$ is disposed. Specifically, when the inspection subject 100$t$ is attached to the pressure-applying cap 66, a space 72 is formed inside the pressure-applying cap 66. In the space 72, the front end portion of the inspection subject 100$t$ including a front end portion 5$t$ of the center electrode 5 is disposed. Note that when the inspection subject 100$t$ is installed in the inspection device 60', the ground electrode 27 is grounded.

The pressure-applying cap 66 has a flow channel 68 for connecting between the outside and the space 72 formed inside the pressure-applying cap 66. In the inspection step, the space 72 is filled via the flow channel 68 with one of insulating liquid and compressed gas (compressed air), which is compressed to have pressure higher than the atmospheric pressure. In this embodiment, the compressed air is used. In the case of using the compressed gas, pressure is applied to the space 72 so that the space 72 has a predetermined pressure (for example, 0.8 MPa to 3.5 MPa).

The casing 65 is disposed to surround the pressure-applying cap 66. The casing 65 has the AE sensor 74 attached thereto. The AE sensor 74 is electrically connected to a personal computer (PC) (not shown). The AE sensor 74 receives the vibration wave generated when a predetermined voltage is applied between the ground electrode 27 and the center electrode 5, and converts the wave into a vibration wave signal. The vibration wave signal is analyzed according to an analysis program installed in the PC. The analysis performed in the inspection step is specifically described later.

Figure 11:
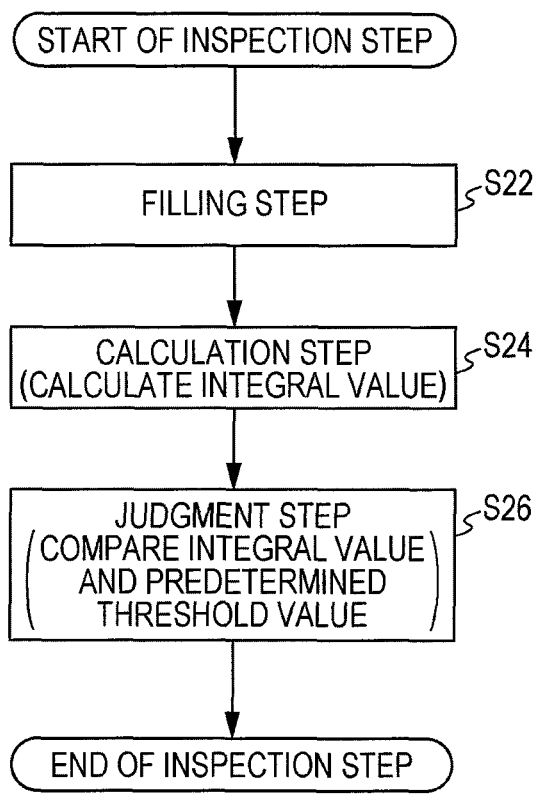
FIG. 11 is a detailed flow chart illustrating the inspection step.

FIG. 11 is a flowchart illustrating the first embodiment related to the inspection step. The inspection step is started after the inspection subject 100$t$ is installed in the inspection device 60'. The inspection step includes a filling step (Step S22), a calculation step (Step S24), and a judgment step (S26).

In the filling step, the space 72 (FIG. 10) including the front end portion 5$t$ is filled with one of the compressed gas and the insulating liquid via the flow channel 68, and the space 72 is pressed to have a predetermined pressure higher than the atmospheric pressure (Step S22).

The calculation step is performed according to the following procedure (Step S24). First, the AE sensor 74 receives the vibration wave generated from the inspection subject 100$t$ in the case where predetermined voltage is applied to the inspection subject 100$t$ installed in the inspection device 60'. Then, the AE sensor 74 converts the received vibration wave into a vibration wave signal. The analysis program installed in the PC performs fast Fourier transformation (FFT) on the vibration wave signal, thereby providing a power spectrum. Then, the analysis program calculates the integral values of a predetermined frequency range of the power spectrum (for example, 800 to 1000 kHz).

In the judgment step, whether the vibration wave generated in the calculation step is caused by the discharge due to the dielectric breakdown in the insulator 2 is judged using the integral values obtained in the calculation step (Step S26). Specifically, in the judgment step, whether the discharge has occurred due to the dielectric breakdown in the insulator 2 is judged by comparing the integral value and a predetermined threshold value. In this embodiment, in the judgment step, if the integral value obtained in the calculation step is greater than the predetermined threshold value, it is determined that aerial discharge has occurred. On the other hand, if the integral value obtained in the calculation step is less than the predetermined threshold value, it is determined that discharge caused by the dielectric breakdown in the insulator 2 (also called "penetration discharge") has occurred (Step S26).

Figure 12:
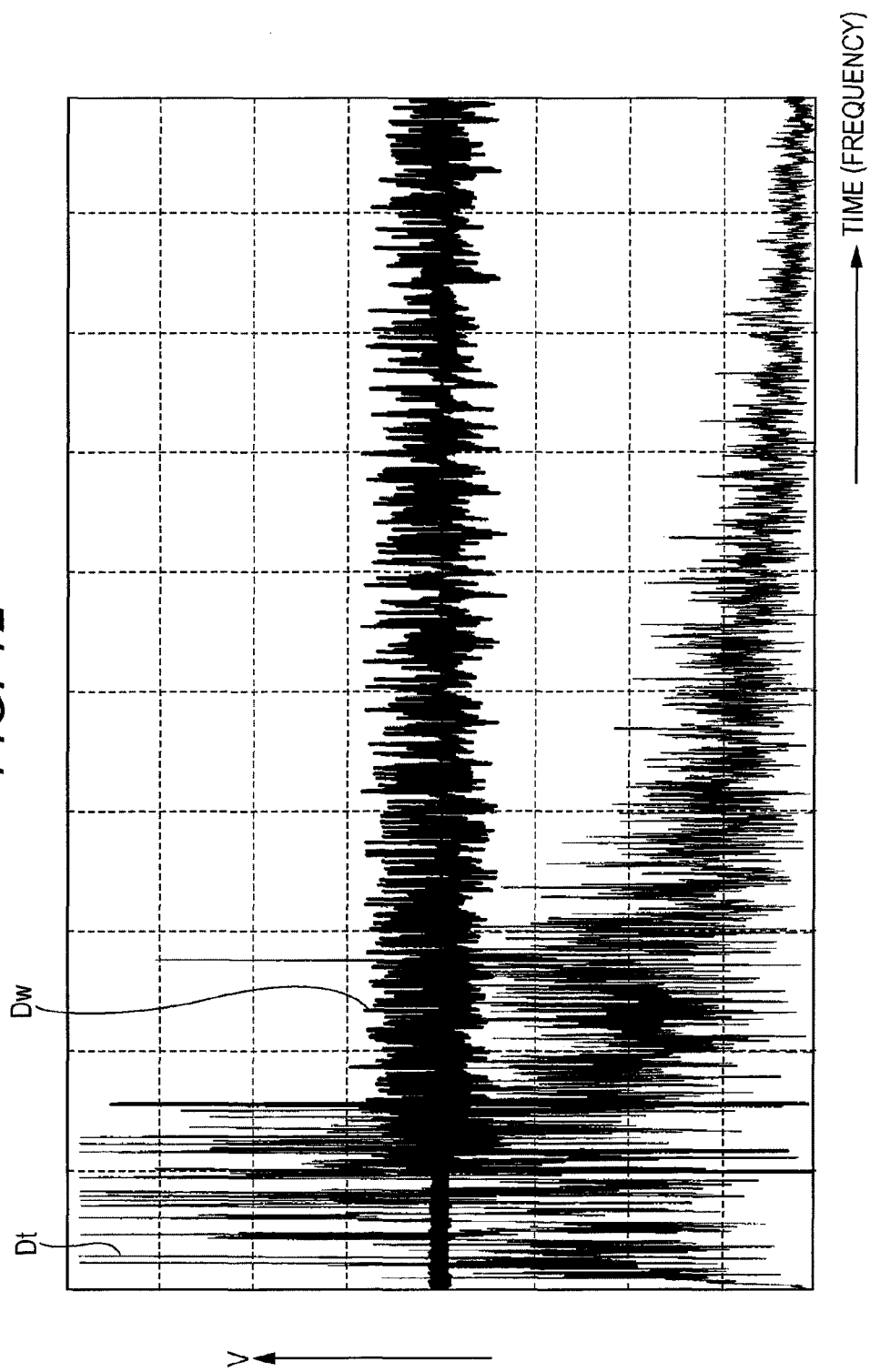
FIG. 12 is a graph illustrating the raw waveform of a vibration wave and the FFT waveform.

FIG. 12 is a graph illustrating the raw waveform DW of the vibration wave and the FFT waveform (power spectrum) Dt obtained by performing the fast Fourier transformation on the raw waveform DW, which are obtained in the calculation step (Step S24). In FIG. 12, the horizontal axis represents the time in the raw waveform Dw and represents the frequency in the power spectrum Dt. In FIG. 12, the vertical axis represents the volt (V). FIG. 12 illustrates the waveform due to any of the penetration discharge and the aerial discharge. However, the raw waveform Dw by the penetration discharge and the raw waveform Dw by the aerial discharge are similar to each other. Thus, it is difficult to judge from the raw waveform Dw, which one of the penetration discharge and the aerial discharge has occurred.

Therefore, in this embodiment, the FFT waveform Dt is obtained from the raw waveform Dw, and the integral value of the FFT waveform Dt is calculated. Then, which one of the penetration discharge and the aerial discharge has occurred from the inspection subject $100t$ during the inspection step is judged by using the calculated integral value. Before the reason thereof is described, a step of deciding (decision step) the predetermined threshold value used in the judgment step of the inspection step is described.

Figure 13:
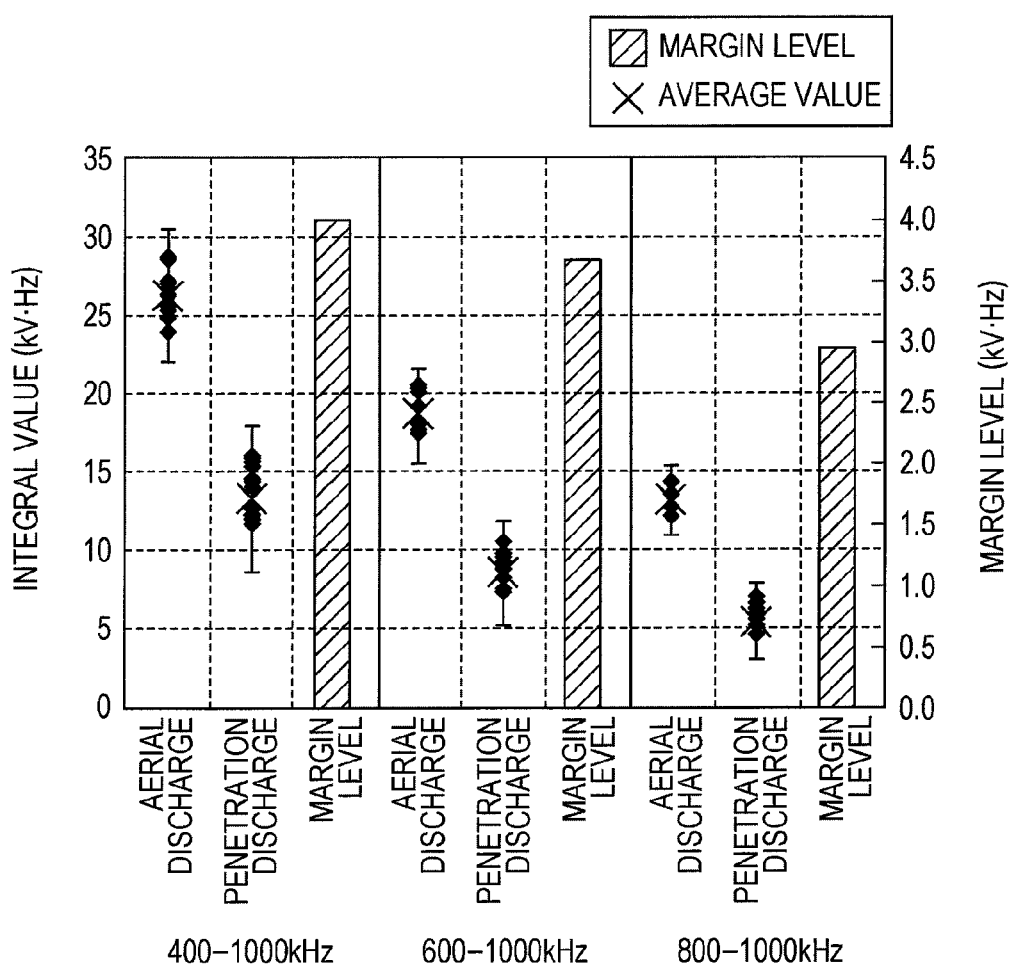
FIG. 13 is a graph illustrating the integral values and the margin levels.

FIG. 13 is a graph illustrating the integral values and the margin levels. In FIG. 13, the vertical axis on the left side represents the integral value, while the vertical axis on the right side represents the margin level. The margin level corresponds to the difference between the integral value of the aerial discharge and the integral value of the penetration discharge, as described later. In this embodiment, the margin level is the difference between the minimum value of the average value $\pm 3\sigma$ ($\sigma$ is a standard deviation) of a plurality of integral values of aerial discharge calculated from the plural inspection subjects $100t$ and the maximum value of the average value $\pm 3\sigma$ ($\sigma$ is a standard deviation) of a plurality of integral values of penetration discharge calculated from the plural inspection subjects $100t$. Note that "aerial discharge" along the horizontal axis of FIG. 13 is for the inspection subject $100t$ in which only the aerial discharge has occurred in the inspection step (Step S20). "Penetration discharge" is for the inspection subject $100t$ in which only the penetration discharge has occurred in the inspection step (Step S20).

The graphs of "aerial discharge" and "penetration discharge" in FIG. 13 were created as follows. A predetermined level of voltage was applied and the vibration wave was received in the AE sensor 74 using the inspection device 60' under the same condition for each of the inspection subjects $100t$. Then, using the analysis program, the power spectrum Dt was obtained and the integral value in the predetermined frequency range was calculated. On the other hand, as for the plural inspection subjects $100t$ in which the discharge has occurred by the application of the predetermined level of voltage by the inspection device 60', which one of the penetration discharge and the aerial discharge has occurred was judged based on the criterion as follows. That is, a visual check of whether the dielectric breakdown has occurred in the insulator 2 was performed. The inspection subject $100t$ in which the dielectric breakdown has occurred was regarded as the inspection subject $100t$ in which the penetration discharge has occurred. The inspection subject $100t$ in which the dielectric breakdown has not occurred was regarded as the inspection subject $100t$ in which the aerial discharge has occurred. Then, the integral values of the inspection subject $100t$ in which the aerial discharge has occurred were plotted as the integral values of "aerial discharge" illustrated in FIG. 13. The integral values of the inspection subject $100t$ in which the penetration discharge has occurred were plotted as the integral values of "penetration discharge" illustrated in FIG. 13. The graphs of "aerial discharge" and "penetration discharge" were created for each of three different frequency ranges of the power spectrum Dt. In this embodiment, the graphs were created for the three frequency ranges of (i) 400 to 1000 kHz, (ii) 600 to 1000 kHz, and (iii) 800 to 1000 kHz. The bar range in "aerial discharge" and "penetration discharge" is the average value $\pm 3\sigma$ ($\sigma$ is a standard deviation). The bar range may be set in consideration of the variation in integral value relative to the actual measurement value, and is not limited to the above embodiment. For example, the upper-limit value and the lower-limit value of the actual measurement value may be the upper-limit value and the lower-limit value of the bar.

As illustrated in FIG. 13, in each of the frequency ranges, the differential value of the power spectrum Dt is in the different integral value range between the aerial discharge and the penetration discharge. In other words, the filling step (Step S22) and the calculation step (Step S24) of the inspection step are performed in advance. The integral values when the penetration discharge has occurred (also referred to as "first particular integral values") and the integral values when the aerial discharge has occurred (also referred to as "second particular integral values") are distinguished. Thus, a first particular integral value range where the first particular integral values are distributed and a second particular integral value range where the second particular integral values are distributed can be decided. The integrated value between the first particular integral value range and the second particular integral value range is decided as the predetermined threshold value before the inspection step is started. For example, the diagram like FIG. 13 is created before the inspection step is started. In the case of the range of 400 to 1000 kHz in FIG. 13, the integral value positioned between the integral value range of "aerial discharge" and the integral value range of "penetration discharge" (for example, 20 kV·Hz) is set as the predetermined threshold value.

The predetermined frequency range used in the calculation step is preferably the range of 1000 kHz (1 MHz) or less. The vibration wave generated by the penetration discharge or the aerial discharge is mainly 1000 kHz or less. Thus, by setting the predetermined frequency range to 1000 kHz or less, the discharge by the dielectric breakdown can be judged accurately while the data for judging the discharge in the inspection step are suppressed to the minimum.

Moreover, the predetermined frequency range is preferably decided as follows. As illustrated in FIG. 13, the first particular integral value obtained from the vibration wave generated from the inspection subject $100t$ by the discharge caused by the dielectric breakdown in the insulator 2 and the second particular integral value obtained from the vibration wave generated from the inspection subject $100t$ by aerial discharge are calculated for each of the different frequency ranges. From the different frequency ranges, the particular frequency range where the difference (margin level) between the first particular integral value and the second particular integral value is the largest is decided (decision step). For example, in FIG. 13, the range of 400 to 1000 kHz is decided as the particular frequency range. Thus, the judgment step of judging whether the discharge has occurred or not by the dielectric breakdown by using the integral values can be performed more accurately. Here, each of the first particular integral value and the second particular integral value may be one integral value or may have a predetermined numeral range where the plural integral values are distributed as described in this embodiment.

In this embodiment, whether the dielectric breakdown has occurred is judged by calculating the integral value of the predetermined frequency range of the power spectrum (Step S26 of FIG. 11). In other words, the judgment step is performed using the integral value of the power spectrum. Thus, the discrimination between the penetration discharge and the aerial discharge can be performed accurately.

In the above embodiment, the discharge can be easily judged as the penetration discharge by comparing the integral value calculated in the calculation step and the predetermined threshold value.

In the above embodiment, in the filling step, the space 72 is filled with one of the compressed gas and the insulating liquid (FIG. 10 and FIG. 11). This can suppress the normal discharge even though high voltage is applied to the inspection subject 100t in the inspection step.

In the above embodiment, moreover, the spark plug before the bending step is used as the inspection subject 100t in the inspection step. Thus, the inspection step can be performed using the inspection subject 100t before the designed spark gap is formed. As a result, in the inspection step, the normal discharge that would occur between the center electrode 5 and the ground electrode 27 can be suppressed.

In the above embodiment, the inspection step can be performed without assembling an unnecessary component in the inspection step. In other words, the inspection step treats as a defective product the inspection subject 100t determined to have experienced the discharge due to the dielectric breakdown.

According to the above embodiment, the inspection subject 100t determined to have experienced the discharge due to the dielectric breakdown is eliminated as the defective product (Step S30). Thus, the manufacture of the defective product as the finished product can be prevented. As a result, the spark plug 1 with excellent dielectric strength of the insulator 2 can be manufactured.

Figure 14:
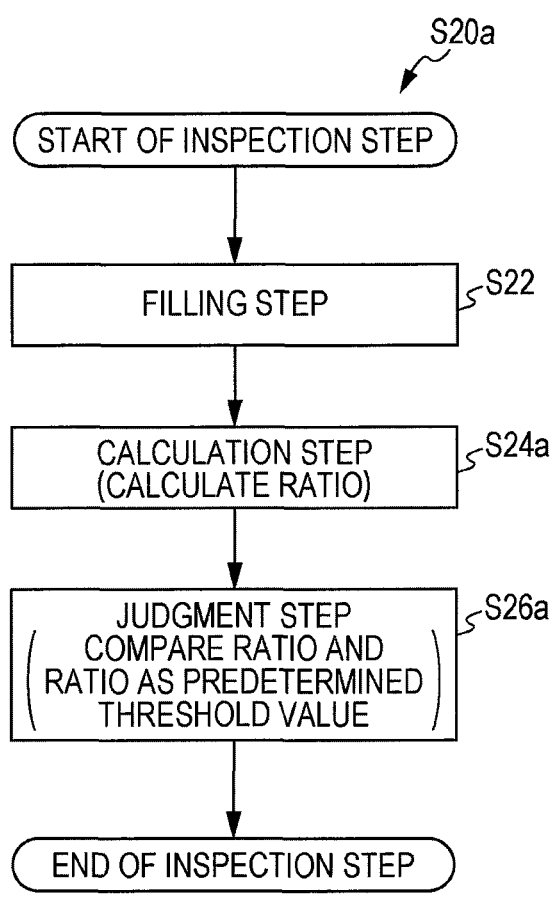
FIG. 14 is a flowchart illustrating a second embodiment related to the inspection step.

FIG. 14 is a flowchart illustrating a second embodiment of the inspection step (Step S20a). The second embodiment is different from the first embodiment in the content of the inspection step. The other steps in the second embodiment are the same as those of the first embodiment. Thus, the steps with the same content as those of the first embodiment are not described.

The calculation step in this embodiment is performed according to the following procedure (Step S24a). In a manner similar to the inspection step in the first embodiment, the power spectrum Dt is obtained by performing the FFT on the vibration wave signal. Then, the predetermined frequency range (for example, 0 to 500 kHz) is divided into a first frequency range and a second frequency range that do not overlap with each other. For example, in this embodiment, the first frequency range is 0 to 250 kHz and the second frequency range is 250 to 500 kHz. In the power spectrum Dt, the integral value (also referred to as "first integral value") of the first frequency range and the integral value (also referred to as "second integral value") of the second frequency range are calculated. Then, the ratio of the first integral value to the second integral value is calculated. In this embodiment, the ratio is (first integral value)/(second integral value).

In the judgment step, whether the vibration wave generated in the calculation step is caused by the discharge that has occurred due to the dielectric breakdown in the insulator 2 or not is judged based on the ratio calculated in the calculation step (Step S26a). Specifically, in the judgment step, whether the discharge has occurred due to the dielectric breakdown or not is judged by comparing the ratio and the predetermined threshold value. Here, in the second embodiment, the ratio (first integral value/second integral value) may be used as the predetermined threshold value.

According to the second embodiment, even though the voltage applied to the inspection subject 100t fluctuates in the calculation step, the occurrence of the discharge by the dielectric breakdown can be easily judged based on a certain criterion. The reason is specifically described with reference to FIG. 15 and FIG. 16.

Figure 15:
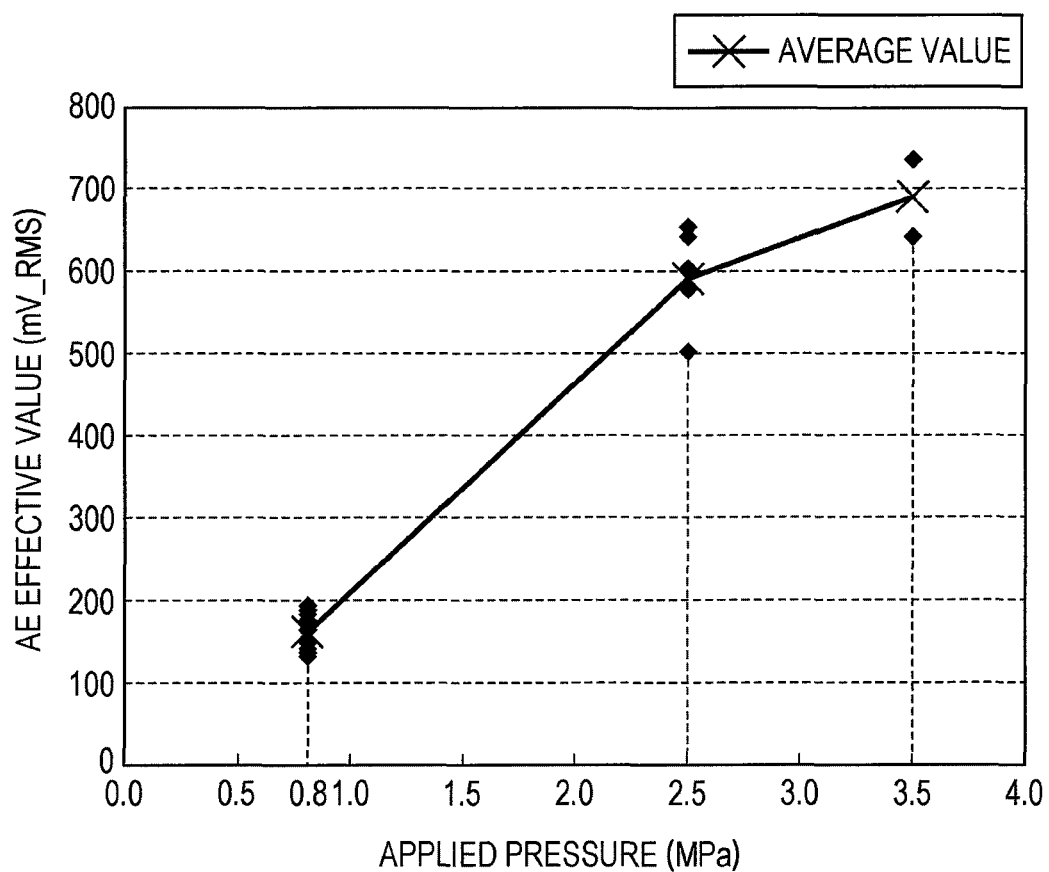
FIG. 15 is a graph illustrating the relation between the applied pressure and the effective value of the AE waveform.

FIG. 15 is a graph illustrating the relation between the applied pressure and the effective value (AE effective value) of the acoustic emission waveform (AE waveform). Here, the AE effective value illustrated along the vertical axis of FIG. 15 is generally called the AE energy, and represents the relative value of the energy of the waveform. The applied pressure illustrated along the horizontal axis of FIG. 15 represents the pressure of the compressed gas introduced to the space 72. FIG. 15 is a diagram where the AE effective value of the acoustic emission generated from the inspection subject 100t when the pressure of the compressed gas introduced to the space 72 is changed is calculated. The AE effective values related to the plural inspection subjects 100t are also calculated while the pressure of the compressed gas introduced to the space 72 is changed. In FIG. 15, the average value of the AE effective values for each pressure is also plotted.

In FIG. 15, the AE effective value is calculated and plotted for each of the three kinds of pressure: 0.8 MPa, 2.5 MPa, and 3.5 MPa. As the applied pressure is increased, the voltage applied to the inspection subject 100t is increased. As illustrated in FIG. 8, as the applied pressure (applied voltage) is increased, the AE effective value is also increased. In other words, in the calculation step, when the integral value is used as the predetermined threshold value, if the level of the voltage to be applied to the inspection subject 100t is changed, the predetermined threshold value is reset for each applied voltage.

Figure 16:
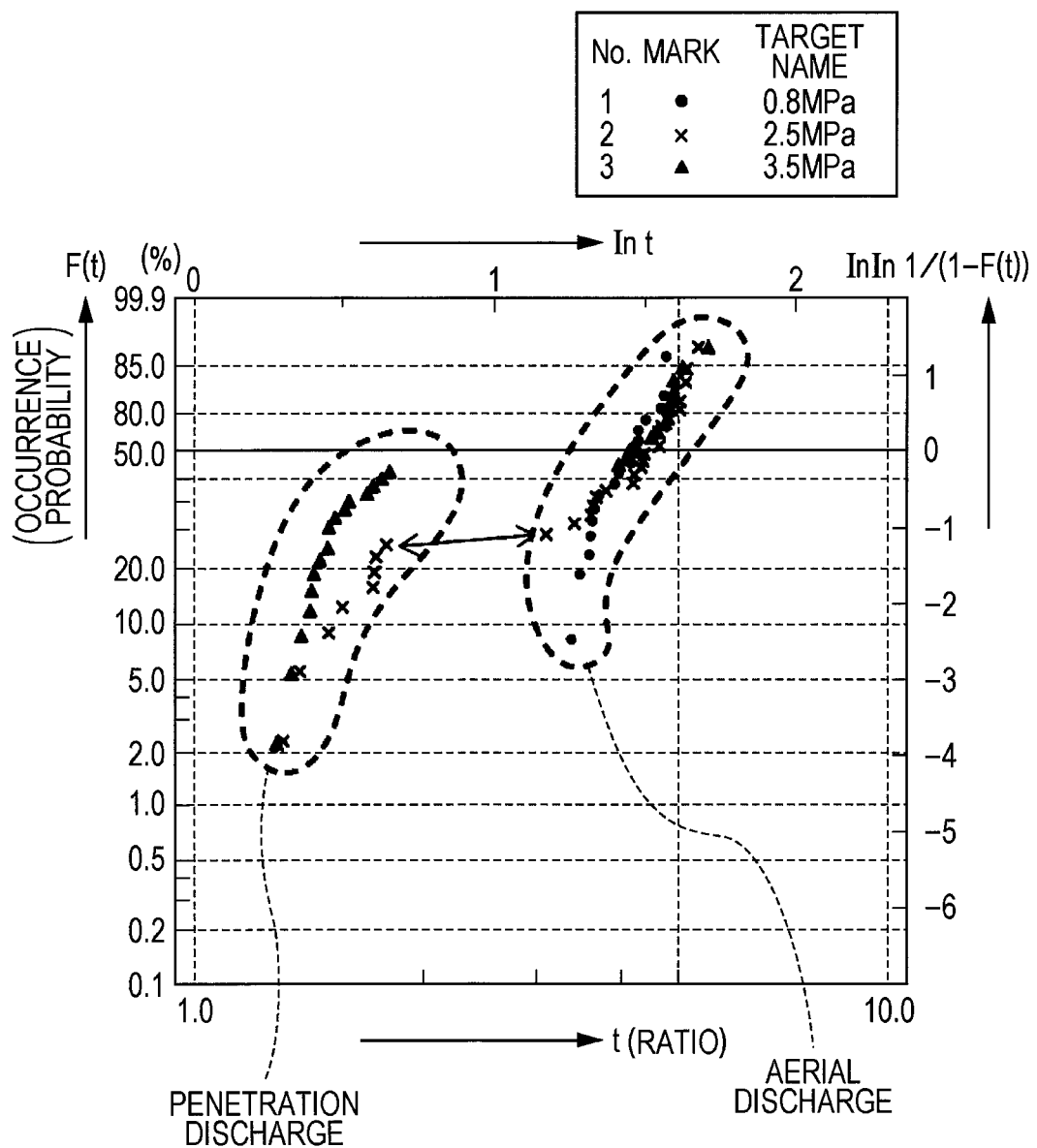
FIG. 16 is a graph illustrating the relation between the ratio of the integral values and the occurrence probability.

FIG. 16 is a graph illustrating the relation between the ratio of the integral values and the occurrence probability. The horizontal axis represents the ratio (first integral value/second integral value), and the vertical axis on the left side represents the occurrence probability (%). FIG. 16 was created as follows in a manner similar to FIG. 15. The power spectrums were calculated relative to the plural inspection subjects 100t for each of the three applied pressures. The ratio of the first integral value to the second integral value (first integral value/second integral value) was obtained. According to Weibull analysis, the occurrence probability for each ratio was calculated. Meanwhile, by visually checking whether the dielectric breakdown in the insulator 2 has occurred in the inspection subject 100t after the ratio was obtained, which one of the penetration discharge and the aerial discharge has occurred was judged. The dots plotted in the range on the left side in FIG. 16 correspond to the inspection subjects 100t where the penetration discharge has occurred. The dots plotted in the range on the right side in FIG. 16 correspond to the inspection subjects 100t where the aerial discharge has occurred.

As illustrated in FIG. 16, even though the applied pressure (i.e., applied voltage) in the space 72 (FIG. 10) is changed, the ratio calculated from the power spectrum of the penetration discharge and the ratio calculated from the power spectrum of the aerial discharge are distributed in different ranges. Even when the applied pressure in the space 72 is changed, the ratio calculated from the power spectrum of the penetration discharge is distributed in the same range (first range) regardless of the applied pressure. The ratio calculated from the power spectrum of the aerial discharge is also distributed in the same range (second range) regardless of the applied pressure. In other words, the ratio between the first range and the second range is decided as the predetermined threshold value used in the judgment step. Thus, the judgment step can be performed accurately.

In other words, in the judgment step, the predetermined threshold value and the ratio calculated in the calculation step are compared. If the calculated ratio is smaller than the predetermined threshold value, it is determined that the penetration discharge has occurred. Meanwhile, if the calculated ratio is larger than the prescribed threshold value, it is determined that the aerial discharge has occurred (Step S26a).

According to the second embodiment, the process and structure similar to those of the first embodiment provide the effect similar to the effect of the first embodiment. Further, in the second embodiment, the judgment step is performed based on the ratio of the first integral value to the second integral value (Step S26a). Therefore, the discharge can be easily judged as the penetration discharge based on a certain criterion regardless of the level of the voltage to be applied to the inspection subject 100t.

The components in the above embodiments other than the components described in the independent claims in the scope of claims correspond to additional components, which can be omitted as appropriate. The present disclosure is not limited to the above embodiments. The present disclosure can be carried out in various modes without departing from the content. The present disclosure can be modified as follows, for example.

In the first embodiment, the predetermined threshold value is the value obtained in advance between the integral value of the penetration discharge and the integral value of the aerial discharge. However, the judgment step may alternatively performed using at least one of the range of the integral value of the aerial discharge (first integral value range) and the range of the integral value of the penetration discharge (second integral value range) which is obtained in advance. For example, if the first integral value range obtained in advance is used in the judgment step, the integral value calculated in the calculation step is compared with the first integral value range. If the integral value calculated in the calculation step is within the first integral value range, it is determined that the aerial discharge has occurred. On the other hand, if the integral value calculated in the calculation step is out of the first integral value range, it is determined that the penetration discharge has occurred. Moreover, for example, when the second integral value range obtained in advance is used in the judgment step, the ratio calculated in the calculation step is compared with the second integral value range. If the integral value calculated in the calculation step is within the second integral value range, it is determined that the penetration discharge has occurred. Meanwhile, if the ratio calculated in the calculation step is out of the second integral value range, it is determined that the aerial discharge has occurred.

In the second embodiment, the predetermined threshold value is the value obtained in advance between the range where the ratio of the first integral value to the second integral value calculated based on the acoustic emission (AE) generated due to the aerial discharge is distributed (first ratio range) and the range where the ratio of the first integral value to the second integral value calculated based on the AE generated due to the penetration discharge is distributed (second ratio range). However, the present disclosure is not limited thereto, and the judgment step may be performed using at least one of the first ratio range and the second ratio range obtained in advance. For example, when the first ratio range obtained in advance is used in the judgment step, if the ratio calculated in the calculation step is within the first ratio range, it is determined that the aerial discharge has occurred. On the other hand, if the ratio calculated in the calculation step is out of the first ratio range, it is determined that the penetration discharge has occurred. For example, when the second ratio range obtained in advance is used in the judgment step, if the ratio calculated in the calculation step is within the second ratio range, it is determined that the penetration discharge has occurred. On the other hand, if the ratio calculated in the calculation step is out of the second ratio range, it is determined that the aerial discharge has occurred.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for inspecting a spark plug comprising the steps of:
    providing a tubular insulator having an axial hole extending in a direction of an axis, a center electrode inserted into the axial hole at a front end side thereof, a tubular metallic shell disposed around the insulator, an annular space defined by an outer circumferential surface of the insulator and an inner circumferential surface of the metallic shell and opened frontward;
    applying a voltage to the center electrode;
    photographing an area including at least the center electrode, the insulator, and the annular space from a front end side in the direction of the axis to obtain an image when the voltage is applied to the center electrode;
    detecting a discharge in the photographed area;
    determining whether a dielectric breakdown has occurred based on the photographed image including the insulator and the annular space; and
    inspecting an insulation performance of the insulator based on a result of the determining step.

2. The method for inspecting the spark plug according to claim 1, further comprising the step of:
    controlling time of photographing the image and timing of applying the voltage to the center electrode based on one common signal.

3. The method for inspecting the spark plug according to claim 1, wherein,
    the determining step is performed using information based on luminance of a region in the photographed image including the insulator and the annular space and using a predetermined threshold value.

4. The method for inspecting the spark plug according to claim 3, further comprising the steps of:
    providing the luminance of each pixel in the region as the information;
    binarizing the region based on the luminance of each pixel and the threshold value to give a binary image;
    calculating a barycentric coordinate of a high-luminance part of the binary image; and
    determining whether the dielectric breakdown has occurred based on the barycentric coordinate.

5. The method for inspecting the spark plug according to claim 3, further comprising the steps of:
   providing the luminance of each pixel in the region as the information;
   binarizing the area based on the luminance of each pixel and the threshold to give a binary image; and
   determining whether the dielectric breakdown has occurred based on whether a high-luminance part of the binary image is continuous ranging from a position of the center electrode to a position of the annular space.

6. The method for inspecting the spark plug according to claim 3, further comprising the steps of:
   providing average luminance in the region as the information; and
   comparing the average luminance and the threshold value to determine whether the dielectric breakdown has occurred.

7. The method for inspecting the spark plug according to claim 3, further comprising the steps of:
   providing the luminance of each pixel in the region as the information; and
   determining whether the dielectric breakdown has occurred based on total number of pixels having luminance satisfying a predetermined relation with the threshold value.

8. The method for inspecting the spark plug according to claim 1, further comprising the step of:
   obtaining a differential value of the voltage applied to the center electrode, wherein
   the determining step is performed based on the photographed image when the differential value is not less than or greater than a predetermined threshold value.

9. A method for manufacturing the spark plug, further comprising the step of: carrying out the inspection method according to claim 1.

10. The method for manufacturing the spark plug according to claim 9, further comprising the step of:
    bending a straight rod-shaped ground electrode disposed at a front end portion of the metallic shell, wherein
    the inspection method is carried out before the step of bending the ground electrode.

11. The method for inspecting the spark plug according to claim 1, further comprising the step of:
    filling a space including a front end portion of the center electrode with any one of insulating liquid and compressed gas compressed to have higher pressure than atmospheric pressure, before the voltage is applied.

* * * * *